(12) United States Patent
Makikawa et al.

(10) Patent No.: US 11,067,835 B2
(45) Date of Patent: Jul. 20, 2021

(54) METHOD FOR PRODUCING TRANSPARENT CERAMIC, TRANSPARENT CERAMIC, MAGNETO-OPTICAL DEVICE AND RARE EARTH OXIDE POWDER FOR SINTERING

(71) Applicant: Shin-Etsu Chemical Co., Ltd., Tokyo (JP)

(72) Inventors: Shinji Makikawa, Annaka (JP); Shinji Aoki, Annaka (JP); Yoshihiro Nojima, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 0 days.

(21) Appl. No.: 16/299,512

(22) Filed: Mar. 12, 2019

(65) Prior Publication Data
US 2019/0212585 A1 Jul. 11, 2019

Related U.S. Application Data

(62) Division of application No. 15/313,885, filed as application No. PCT/JP2015/065756 on Jun. 1, 2015.

(30) Foreign Application Priority Data

Jun. 4, 2014 (JP) .................. 2014-115995

(51) Int. Cl.
| | |
|---|---|
| C09K 11/08 | (2006.01) |
| G02F 1/00 | (2006.01) |
| C01F 17/00 | (2020.01) |
| C04B 35/50 | (2006.01) |
| G02F 1/09 | (2006.01) |
| G02B 27/28 | (2006.01) |
| C04B 35/505 | (2006.01) |
| C04B 35/626 | (2006.01) |
| C04B 35/63 | (2006.01) |
| C04B 35/64 | (2006.01) |
| C04B 35/645 | (2006.01) |

(52) U.S. Cl.
CPC ............ *G02F 1/0036* (2013.01); *C01F 17/00* (2013.01); *C04B 35/50* (2013.01); *C04B 35/505* (2013.01); *C04B 35/6264* (2013.01); *C04B 35/6303* (2013.01); *C04B 35/64* (2013.01); *C04B 35/645* (2013.01); *G02B 27/28* (2013.01); *G02F 1/09* (2013.01); *G02F 1/093* (2013.01); *C04B 2235/3224* (2013.01); *C04B 2235/3225* (2013.01); *C04B 2235/60* (2013.01); *C04B 2235/9653* (2013.01)

(58) Field of Classification Search
CPC combination set(s) only.
See application file for complete search history.

(56) References Cited

U.S. PATENT DOCUMENTS

| | | | |
|---|---|---|---|
| 5,013,696 A | 5/1991 | Greskovich et al. | |
| 5,609,911 A | 3/1997 | Okabe et al. | |
| 6,825,144 B2 | 11/2004 | Hideki et al. | |
| 8,753,538 B2 * | 6/2014 | Makikawa | C04B 35/50 252/301.4 R |
| 2014/0002900 A1 | 1/2014 | Makikawa et al. | |

FOREIGN PATENT DOCUMENTS

| | | |
|---|---|---|
| JP | 63-307102 A | 12/1988 |
| JP | 5-330913 A | 12/1993 |
| JP | 8-26834 A | 1/1996 |
| JP | 2638669 B2 | 8/1997 |
| JP | 2001-39716 A | 2/2001 |
| JP | 2005-283635 A | 10/2005 |
| JP | 4033451 B2 | 1/2008 |
| JP | 2010-285299 A | 12/2010 |
| JP | 2012-206935 A | 10/2012 |

OTHER PUBLICATIONS

International Search Report dated Aug. 18, 2015, issued in counterpart International Application No. PCT/JP2015/065756 (2 pages).
U.S. Non-Final Office Action dated Jul. 6, 2018, issued in related U.S. Appl. No. 15/313,885 (11 pages).

* cited by examiner

*Primary Examiner* — Monique R Peets
(74) *Attorney, Agent, or Firm* — Westerman, Hattori, Daniels & Adrian, LLP

(57) ABSTRACT

A starting material powder, which contains a rare earth oxide that is composed of terbium oxide and at least one other rare earth oxide selected from among yttrium oxide, scandium oxide and oxides of lanthanide rare earth elements (excluding terbium) and a sintering assistant that is formed of an oxide of at least one element selected from among group 2 elements and group 4 elements, is produced by having (a) terbium ions, (b) ions of at least one other rare earth element selected from among yttrium ions, scandium ions and lanthanide rare earth ions (excluding terbium ions) and (c) ions of at least one element selected from among group 2 elements and group 4 elements coprecipitate in an aqueous solution containing the components (a)-(c), then filtering and separating the coprecipitate, and subjecting the separated coprecipitate to thermal dehydration.

11 Claims, 2 Drawing Sheets

METHOD FOR PRODUCING TRANSPARENT CERAMIC, TRANSPARENT CERAMIC, MAGNETO-OPTICAL DEVICE AND RARE EARTH OXIDE POWDER FOR SINTERING

This application is a divisional application of U.S. patent application Ser. No. 15/313,885 filed Nov. 23, 2016, and is based upon and claims the benefits of priority from PCT/JP2015/065756 filed on Jun. 1, 2015, which claims the benefits of priority of Japanese Patent Application 2014-115995 filed on Jun. 4, 2014, the entire contents of which are incorporated herein by reference.

TECHNICAL FIELD

The present invention relates to a method for producing a transparent ceramic for use in magneto-optical devices which is to be used for constituting a magneto-optical device such as an optical isolator, and to a transparent ceramic. Also, the invention relates to a magneto-optical device such as a Faraday rotator and an optical isolator, and to a rare earth oxide powder for sintering.

BACKGROUND ART

With the advance of laser processing machines, in recent years, magneto-optical devices utilizing interactions between light and magnetism have come to draw attention. One of these devices is an isolator, which is for a function to inhibit the phenomenon in which if light oscillated from a laser source is reflected by an optical system in its path and returns to the light source, then it disturbs the light oscillated from the laser source, to cause an unstable oscillation state. Therefore, the optical isolator is used in the state of being disposed between a laser source and an optical component, utilizing this function.

An optical isolator includes three component parts, namely, a Faraday rotator, a polarizer disposed on the light incoming side of the Faraday rotator, and an analyzer arranged on the light outgoing side of the Faraday rotator. The optical isolator utilizes the nature, so-called Faraday effect, that when light enters the Faraday rotator under the condition where a magnetic field is applied to the Faraday rotator in a direction parallel to the traveling direction of the light, the plane of polarization is rotated in the Faraday rotator. Specifically, that component of the incident light which has the same plane of polarization as that of the polarizer is transmitted through the polarizer and enters the Faraday rotator. This light is rotated by +45 degrees relative to the light traveling direction in the Faraday rotator, before going out therefrom.

On the other hand, when the return light entering the Faraday rotator in an opposite direction to the incident direction first passes through the analyzer, only that component of the light which has the same plane of polarization as that of the analyzer is transmitted through the analyzer and enters the Faraday rotator. Next, in the Faraday rotator, the plane of polarization of the return light is further rotated by +45 degrees in addition to the initial +45 degrees. Since the plane of polarization of the return light is at a right angle of +90 degrees with respect to the polarizer, therefore, the return light cannot pass through the polarizer.

The Faraday angle θ is represented by the following formula (A).

$$\theta = V \times H \times L \quad (A)$$

In the formula (A), V is a Verdet constant which is determined by the material of the Faraday rotator, H is magnetic flux density, and L is the length of the Faraday rotator. For use as an optical isolator, L is determined such that θ=45 degrees.

It is important that the material to be used for the Faraday rotator of the optical isolator as above-mentioned have a large Faraday effect and a high transmittance at the wavelength at which it is used.

Further, if a polarized component different from the incident light is generated in the outgoing light, this different polarized component is transmitted through the polarizer, resulting in insufficient blockage of the return light.

For evaluation of the generation of such a different polarized component, polarized light of 0 to 90 degrees is made to enter a material used as the Faraday rotator, the outgoing light is transmitted through the polarizer into a photodetector, and the light intensity is measured by the photodetector. From the maximum intensity (Imax) and minimum intensity (Imin), an extinction ratio (S) is calculated according to the following formula.

$$S = -10 \log(I\min/I\max) \text{ [unit: dB]}$$

Higher values of extinction ratio are important, and, in general, an extinction ratio of at least 30 dB is required.

Recently, as such material, JP-A 2010-285299 (Patent Document 1) discloses a single crystal oxide and transparent oxide ceramics of $(Tb_xRe_{1-x})_2O_3$ (wherein $0.4 \le x \le 1.0$), that is the material having a high Verdet constant.

Also, JP 4033451 (Patent Document 2) discloses that rare earth oxides represented by the general formula: $R_2O_3$ (wherein R is a rare earth element) are free of birefringence since their crystal structures are cubic, and, accordingly, sintered bodies having a high degree of transparency can be produced if pores and impurity segregates are completely removed.

Further, JP-A H05-330913 (Patent Document 3) discloses that addition of a sintering aid is effective for removing pores. Also, JP 2638669 (Patent Document 4) discloses a method for removing pores by a hot isostatic press followed by re-sintering. A production method involves adding one or more of the sintering aids disclosed in Patent Document 3 or the like, mixing, compacting, calcining, sintering in vacuum, and a HIP (Hot Isostatic Press) treatment.

In Patent Document 1, the transparent oxide ceramics of $(Tb_xRe_{1-x})_2O_3$ (wherein $0.4 \le x \le 1.0$) basically have a cubic crystal structure. However, these transparent oxide ceramics sometimes exhibit faint birefringence because a sintering aid incorporated therein can react with the main component to form a phase different from the cubic crystal that precipitates within crystal grains or at grain boundaries. This may result in a lowering in extinction ratio.

In addition, since the precipitates are of a minute size of up to 1 μm, laser light applied to the ceramic material is scattered there. Due to the scattering, the characteristics of insertion loss may be worse.

Besides, when the ceramic materials are sintered, the composition of the main component $(Tb_xRe_{1-x})_2O_3$ and the concentration of the sintering aid vary between the inside and the outer periphery of the ceramic material due to segregation, resulting in variations of extinction ratio and insertion loss within the ceramic surface.

Further, JP-A 2012-206935 (Patent Document 5) states that an optical ceramic material containing rare earth oxides as main components and having a minimal compositional variation and optical uniformity, with an insertion loss of up to 1.0 dB, specifically, a ceramic which includes a compound of terbium oxide (chemical formula: $Tb_2O_3$) with at least one oxide selected from among yttrium oxide, scandium oxide and lanthanide rare earth oxide having little absorption at a wavelength of 1,064 nm and which contains terbium oxide in a molar ratio of at least 40% is successfully obtained by:

(1) using a starting material having excellent sinterability and a specific particle size distribution;
(2) using a sintering aid having excellent sinterability and capable of maintaining the ceramic crystal structure cubic;
(3) performing sintering in vacuum or an oxygen-free non-oxidizing atmosphere at an optimum temperature and a HIP treatment; and
(4) subjecting the sintered body obtained in this manner to a heat treatment in an oxygen-free atmosphere, for reducing heterophase precipitates which might cause scattering or pores.

In recent years, the outputs of laser processing machines have been being further raised beyond 10 W, and it has become possible to obtain laser processing machines with a high output ranging from 20 W to several hundreds of watts. In this case, since high-power laser light passes through a Faraday optical material of an isolator which is one of component parts of the laser processing machine, the lowering in the laser output upon the passage through the Faraday optical material cannot be ignored, even where the insertion loss is approximately 1.0 dB. Further, if the radiated light is absorbed by the Faraday optical material, the part where the light absorption is occurring and the surrounding part undergo variations in density and refractive index. Specifically, when high-intensity light such as laser light is applied to a Faraday optical material, a temperature distribution is generated in the Faraday optical material between a central portion where heat accumulation is liable to occur and the outside portion where heat is radiated, and the refractive index of the part where the laser light passes is changed more greatly than the refractive index of the surrounding part, resulting in a lens effect. As a result, the laser light which intrinsically should go out in parallel would be focused. This phenomenon, called thermal lens, has been an unstable factor with respect to stable oscillation of laser light.

In addition, if an optical material has a defect that causes light absorption, the light absorbed in the defect is converted into heat, making the thermal lens problem graver.

In view of this, for reducing the thermal lens, it is necessary to further lessen the defects which cause light absorption. Examples of such defects include heterophase precipitates, and pores, oxygen defects of ionic defects which are present at grain boundaries or within crystal grains.

PRIOR ART DOCUMENTS

Patent Documents

Patent Document 1: JP-A 2010-285299
Patent Document 2: JP 4033451
Patent Document 3: JP-A H05-330913
Patent Document 4: JP 2638669
Patent Document 5: JP-A 2012-206935

SUMMARY OF THE INVENTION

Problems to be Solved by the Invention

Since a ceramic containing terbium oxide and an oxide of other rare earth element (scandium, yttrium, lanthanum, europium, gadolinium, ytterbium, thulium, holmium and lutetium) as main components tends to cause scattering so that the insertion loss may be increased, and inversely, the extinction ratio be reduced, measures have been taken to make improvements in these points, but it is very difficult to apply this ceramic to an optical material for optical isolators or the like having come to pose stricter requirements on optical characteristics.

This invention has been made in consideration of the above-mentioned circumstances. Accordingly, it is an object of the invention to provide: a method for producing a transparent ceramic based on a rare earth oxide containing terbium oxide having a high Verdet constant in a region of wavelength 1.06 μm (1,064±40 nm), which exhibits in-plane uniformity and high transparency, causes less scattering and thus enables to reduce the insertion loss; a transparent ceramic; a magneto-optical device of high quality for preferable use in a fiber laser for processing machines tending to be required of a higher output; and a rare earth oxide powder for sintering.

Means for Solving the Problems

For achieving the above object, the invention provides the following method for producing a transparent ceramic, the following transparent ceramic, the following magneto-optical device and the following rare earth oxide powder for sintering.

[1] A method for producing a transparent ceramic containing terbium oxide (chemical formula: $Tb_2O_3$) and at least one other rare earth oxide selected from among yttrium oxide, scandium oxide and oxides of lanthanide rare earth elements (excluding terbium) as main components, the method comprising:

subjecting an aqueous solution containing (a) terbium ions, (b) ions of at least one other rare earth element selected from among yttrium ions, scandium ions and lanthanide rare earth ions (excluding terbium ions) and (c) ions of at least one element selected from among Group 2 elements and Group 4 elements to co-precipitation of the components (a), (b) and (c), filtration and separation of the co-precipitate and thermal dehydration, to form a raw material powder containing a rare earth oxide including terbium oxide and at least one other rare earth oxide selected from among yttrium oxide, scandium oxide and oxides of lanthanide rare earth elements (excluding terbium), the molar ratio of terbium oxide being at least 40 mol % and the balance being the other rare earth oxide, and a sintering aid including an oxide of at least one element selected from among Group 2 elements and Group 4 elements;

forming a molded body using the raw material powder; then firing the molded body; and subjecting the fired molded body to pressure firing.

[2] The method for producing a transparent ceramic of [1], wherein the raw material powder contains more than 0.5 parts by weight and up to 5 parts by weight of the sintering aid per 100 parts by weight of the rare earth oxide.

[3] The method for producing a transparent ceramic of [1] or [2], wherein the component (c) is ions of at least one element selected from among titanium ions, zirconium ions, hafnium ions, calcium ions and magnesium ions.

[4] The method for producing a transparent ceramic of any one of [1] to [3], further comprising subjecting the pressure-fired molded body to a heat treatment at 1,500 to 2,000° C. in a non-oxidizing atmosphere.

[5] The method for producing a transparent ceramic of any one of [1] to [4], wherein the molded body is calcined before the firing.

[6] A transparent ceramic produced by the method for producing a transparent ceramic of any one of [1] to [5], the transparent ceramic containing a rare earth oxide including terbium oxide (chemical formula: $Tb_2O_3$) and an oxide of at least one other rare earth element selected from among yttrium oxide, scandium oxide and oxides of lanthanide rare earth elements (excluding terbium), the molar ratio of terbium oxide being at least 40 mol % and the balance being the other rare earth oxide, and a sintering aid including an oxide of at least one element selected from among Group 2 elements and Group 4 elements.

[7] The transparent ceramic of [6], wherein the content of the sintering aid is more than 0.5 parts by weight and up to 5 parts by weight per 100 parts by weight of the rare earth oxide.

[8] The transparent ceramic of [6] or [7], wherein the sintering aid is an oxide of at least one element selected from among titanium, zirconium, hafnium, calcium and magnesium.

[9] The transparent ceramic of any one of claims [6] to [8], wherein an insertion loss at a wavelength of 1,064 nm inclusive of a reflection loss at an end face in a plane of at least 90% of a measurement surface in a thickness direction of a 10 mm-thick sample is up to 0.97 dB.

[10] A magneto-optical device configured by using the transparent ceramic of any one of [6] to [9].

[11] A magneto-optical device wherein the transparent ceramic of any one of [6] to [9] is used as a Faraday rotator.

[12] The magneto-optical device according [11], for an optical isolator for use in a wavelength region of 1,064±40 nm, wherein polarizing materials are provided on front and rear sides of the Faraday rotator.

[13] A rare earth oxide powder for sintering containing a rare earth oxide including terbium oxide and at least one other rare earth oxide selected from among yttrium oxide, scandium oxide and oxides of lanthanide rare earth elements (excluding terbium), the molar ratio of terbium oxide being at least 40 mol % and the balance being the other rare earth oxide, and a sintering aid including an oxide of at least one element selected from among Group 2 elements and Group 4 elements, the rare earth oxide powder obtained by subjecting an aqueous solution containing (a) terbium ions, (b) ions of at least one other rare earth element selected from among yttrium ions, scandium ions and lanthanide rare earth ions (excluding terbium ions) and (c) ions of at least one element selected from among Group 2 elements and Group 4 elements to co-precipitation of the components (a), (b) and (c), filtration and separation of the co-precipitate and thermal dehydration.

Advantageous Effects of the Invention

According to the present invention, it is possible to improve optical characteristics of transparent ceramics more securely as compared to the conventional production methods reported in JP-A 2012-206935 (Patent Document 5) and the like. Especially, by setting the amount of the sintering aid to a predetermined content, it is possible to provide a transparent ceramic exhibiting good optical characteristics in visible to infrared regions and having comparable or superior performance to those of existing single crystal materials such as terbium gallium garnet, that has not been successfully obtained by the conventional production methods. In addition, the transparent ceramic provided by the present invention is superior to the conventional ceramic materials also in optical loss and optical uniformity. Therefore, according to the present invention it is possible to provide a transparent ceramic which exhibits very little birefringence and very little scattering and can be suitably used for a magneto-optical device for optical isolators in a region of wavelength 1.06 µm (1,064±40 nm).

EMBODIMENT FOR CARRYING OUT THE INVENTION

Figure 1:
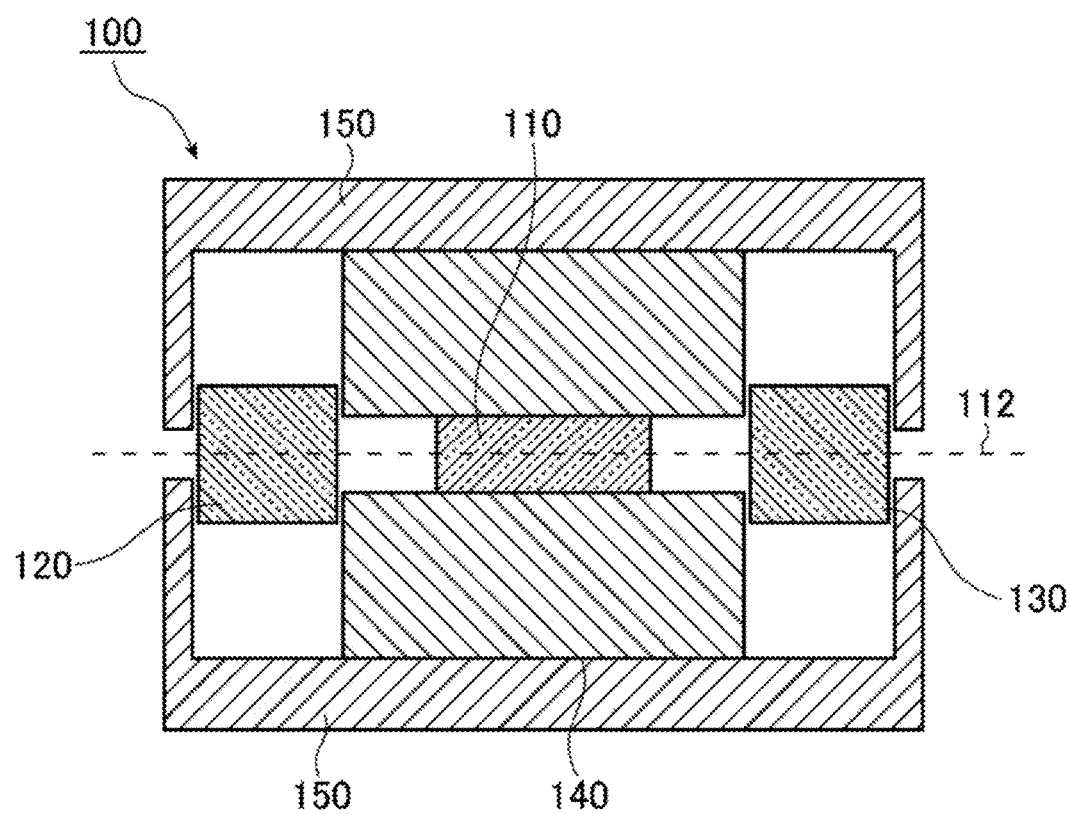
FIG. 1 is a sectional view indicating a general configuration of an optical isolator.

Specific modes for carrying out the present invention will now be described below.

[Method for Producing Transparent Ceramic]

The method for producing a transparent ceramic according to the present invention is a method for producing a transparent ceramic containing terbium oxide (chemical formula: $Tb_2O_3$) and at least one other rare earth oxide selected from among yttrium oxide, scandium oxide and oxides of lanthanide rare earth elements (excluding terbium) as main components, the method including:

(1) a first step of producing a raw material powder (a rare earth oxide powder for sintering) containing a rare earth oxide including terbium oxide and at least one other rare earth oxide selected from among yttrium oxide, scandium oxide and oxides of lanthanide rare earth elements (excluding terbium), the molar ratio of terbium oxide being at least 40 mol % and the balance being the other rare earth oxide, and a sintering aid including an oxide of at least one element selected from among Group 2 elements and Group 4 elements, by subjecting an aqueous solution containing (a) terbium ions, (b) ions of at least one other rare earth elements selected from among yttrium ions, scandium ions and lanthanide rare earth ions (excluding terbium ions), and (c) ions of at least one element selected from among Group 2 elements and Group 4 elements, to co-precipitation of the components (a), (b) and (c), filtration and separation of the co-precipitate, and thermal dehydration (and firing);

(2) a second step of molding the raw material powder to obtain a molded body;

(3) a third step of calcining the molded body to obtain a calcined body;

(4) a fourth step of firing the calcined body in a non-oxidizing atmosphere to obtain a fired body; and (5) a fifth step of pressure firing the fired body to obtain a pressure-fired body.

(First Step)

In the first step, using an aqueous solution containing (a) terbium ions, (b) ions of at least one other rare earth element selected from among yttrium ions, scandium ions and lanthanide rare earth ions (excluding terbium ions) that exhibit substantially no absorption at a wavelength of 1.064 µm, and (c) ions of at least one element selected from among Group 2 elements and Group 4 elements, for example, titanium ion, zirconium ion, hafnium ion, and calcium ion or magnesium ion, to be a sintering aid that restrains precipitation of heterophase other than cubic crystals in the crystal structure of a terbium oxide-based ceramic by being an oxide, the components (a) to (c) are co-precipitated by the so-called co-precipitation method, to produce a raw material powder (a rare earth oxide powder for sintering) which contains a rare earth oxide including terbium oxide and at least one other rare earth oxide selected from among yttrium oxide, scandium oxide and oxides of lanthanide rare earth elements (excluding terbium), the molar ratio of terbium oxide being at least 40 mol % and the balance being the other rare earth oxide, and a sintering aid including an oxide of at least one element selected from among Group 2 elements and Group 4 elements. This production method will be referred to as the three-component co-precipitation method.

The three-component co-precipitation method may, for example, include dissolving predetermined starting materials in such a manner that the above-mentioned components (a), (b) and (c) are contained in an acidic aqueous solution, for example, a 5N nitric acid aqueous solution, adding a basic aqueous solution such as aqueous ammonia to the acidic aqueous solution to precipitate (co-precipitate) the components (a), (b) and (c) as a hydroxide, then filtering and separating the hydroxide, and subjecting the obtained hydroxide to thermal dehydration at a temperature of at least 500° C., to produce an oxide raw material powder. The method for preparing the precipitate is not limited to the method of adding a basic aqueous solution, so long as the components (a), (b) and (c) do not become heterogeneous at the time of precipitation. For instance, a method of adding oxalic acid to an acidic aqueous solution in which the components (a), (b) and (c) are dissolved to precipitate the three components as an oxalate and a method of adding a salt containing carbonic acid ions such as ammonium hydrogen carbonate or ammonium carbonate to the acidic aqueous solution to precipitate the three components as a carbonate can also be utilized preferably. Besides, as a preferable treatment for obtaining a powder with a stabler particle shape, there may be mentioned a method in which a basic aqueous solution such as aqueous ammonia is added dropwise to an acidic aqueous solution containing the ions of the three components to produce a hydroxide, then a salt containing carbonic acid ions such as aqueous solution of ammonium hydrogen carbonate is added dropwise to the hydroxide-containing solution to momentarily replace the hydroxide by a carbonate, followed by aging, and thereafter aqueous ammonia is again added dropwise to the aged carbonate-containing solution to re-replace the carbonate by the hydroxide. By such a procedure, the desired product is precipitated with a stable particle shape without aggregation of particles.

Here, the starting material for the component (a) may be a terbium oxide powder ($Tb_2O_3$) preferably having a purity of at least 99% by weight, more preferably a purity of at least 99.9% by weight or a $Tb_4O_7$ powder having a comparable level of purity, or a powder of any other compound of terbium such as terbium fluoride or nitride so long as the compound powder dissolves in an acidic aqueous solution to give terbium ions, without forming complex ions. In this case, impurity ions may exert an influence at the time of reaction or firing, and, therefore, the terbium oxide powder is preferred.

The starting material for the component (b) is preferably a powder of an oxide of at least one rare earth element selected from among yttrium, scandium and lanthanide rare earth elements (excluding terbium) that has a purity of at least 99% by weight, more preferably a purity of at least 99.9% by weight. Alternatively, the starting material may be a powder of other compound of the at least one rare earth element such as a fluoride or nitride of the at least one rare earth element, so long as the compound powder dissolves in the acidic aqueous solution to give ions of the at least one rare earth element, without forming complex ions. In this case, impurity ions may exert an influence at the time of reaction or firing, and, therefore, yttrium oxide powder, scandium oxide powder and lanthanide rare earth oxide powder are preferred.

The starting material for the component (c) is preferably a powder of an oxide of at least one element selected from among Group 2 elements and Group 4 elements that has a purity of at least 99% by weight, more preferably a purity of at least 99.9% by weight.

These starting materials are weighed in respective amounts corresponding to the composition of the transparent ceramic to be produced finally, and are dissolved in an acidic aqueous solution. Specifically, first, the starting material for the component (a) and the starting material for the component (b) are each weighed such that they provide rare earth oxides in a predetermined molar ratio, and then the starting material for the component (c) is weighed such as to provide an oxide in a predetermined amount in relation to the total weight of the rare earth oxides. Note that in the case where all the starting materials for the components (a), (b) and (c) are oxides which are completely soluble in the acidic aqueous solution, the ratio of the amounts weighed as the starting materials will directly become the weight ratio (parts by weight) in the raw material powder obtained by the three-component co-precipitation method.

In performing the dissolution of the starting materials for the components (a), (b) and (c) weighed as above, the starting materials may be mixed and then the mixed powder may be dissolved in the acidic aqueous solution, or, alternatively, the starting materials may be sequentially dissolved in the acidic aqueous solution.

The acidic aqueous solution is not particularly limited so long as the solution can dissolve the starting materials for the three components, without forming a complex ion, in such a manner as to contain the ions of the components (a) to (c). Examples of the acidic aqueous solution include 5N aqueous nitric acid solution, aqueous sulfuric acid solution, and aqueous hydrochloric acid solution. In this case, an acidic aqueous solution capable of completely dissolving the respective starting materials for the three components is preferred, and aqueous nitric acid solution is more preferred. When aqueous nitric acid solution is used, the residual amount of inorganic salts after firing is small.

A precipitant is not particularly restricted so long as it can co-precipitate all the ions of the three components when added to the acidic aqueous solution containing the ions of the three components, and can be removed from the co-precipitate by rinsing, filtering and separation. Examples of the precipitant include aqueous ammonia ($NH_4OH$), oxalic acid (($COOH)_2$), ammonium hydrogen carbonate ($NH_4HCO_3$), and ammonium carbonate (($NH_4)_2CO_3$). Among these, aqueous ammonia is more preferred, for minimizing the amount of impurity ions.

The oxide raw material obtained by the above-mentioned method is a raw material powder which contains a rare earth oxide including (A) terbium oxide and (B) at least one other rare earth oxide selected from among yttrium oxide, scandium oxide and lanthanide rare earth oxides (excluding terbium oxide) exhibiting little absorption at a wavelength of 1.064 μm, the molar ratio of terbium oxide being at least 40 mol % and the balance being the other rare earth oxide, and (C) a sintering aid including an oxide of at least one element selected from among Group 2 elements and Group 4 elements.

Figure 2A:
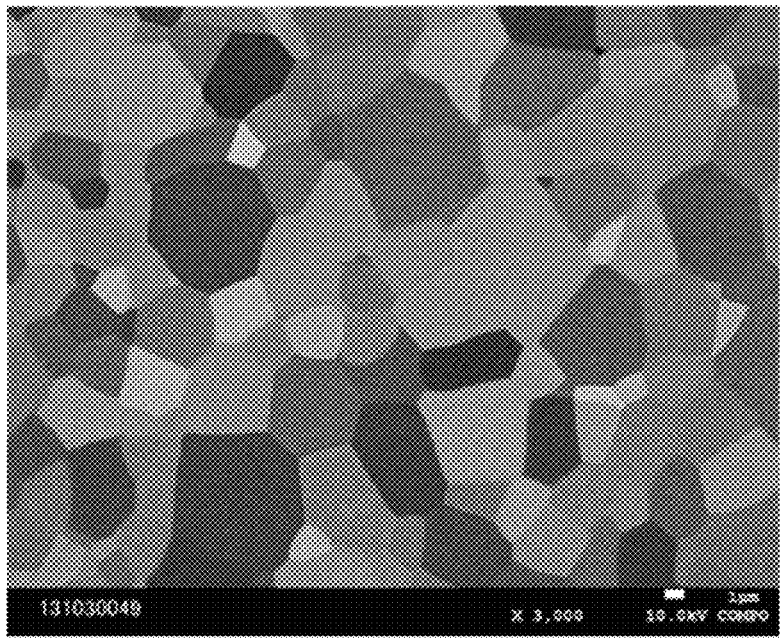
FIGS. 2A and 2B indicate the results of observation of crystal structure for samples in Example and Comparative Example, wherein FIG. 2A indicates the results in Example 1-3, and FIG. 2B indicates the results in Comparative Example 1A-3.
Figure 2B:
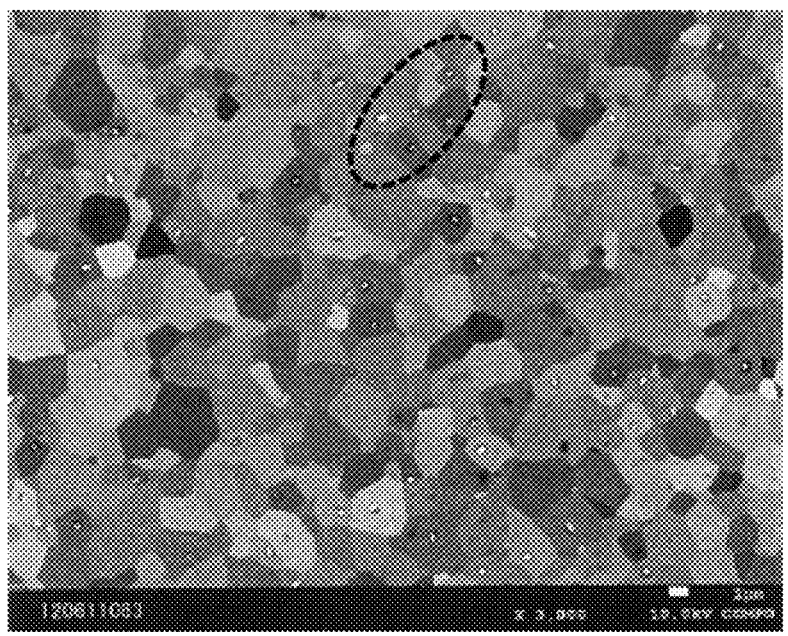

The raw material powder itself is not significantly different from conventional powders on the basis of physical properties such as particle shape and orientation, but it is characterized in that the reaction during sintering thereof takes place uniformly even at a microscopic level. When an electron microscopic reflected electron image of a transparent ceramic obtained by subjecting a conventional powder to vacuum sintering, HIP (Hot Isostatic Press) or the like is viewed, white spots would be seen remaining at crystal grains (FIG. 2B). The reflected electron image permits a difference in reflection intensity to be seen according to the magnitude of the atomic number, such that an element of a larger atomic number (a heavier element) appears whiter. Therefore, the above-mentioned white spots indicate that an element of a larger atomic number (a heavier element) remains in a segregated state at a microscopic level even after the reaction. Besides, in the case of the raw material powder in this embodiment, white spots are not observed, which indicates that a uniform reaction can take place even at a microscopic level (FIG. 2A).

The purity of the raw material powder prepared is preferably at least 99% by weight. For application to optical use, the purity is more preferably at least 99.9% by weight, and further preferably at least 99.99% by weight.

In this case, (A) terbium oxide and (B) the other rare earth oxide are present in such amounts that, let the molar ratio of the total amount of them be 1 (100 mol %), then the amount of (A) terbium oxide is at least 40 mol %, preferably 40 to 60 mol %, the balance being (B) the other rare earth oxide. Essentially, the oxide raw material powder includes the components (A) and (B) and the sintering aid as the component (C).

That the raw material powder contains the components (A) and (B) as main components means that the raw material powder contains the oxides of the components (A) and (B) in a total amount of at least 50% by weight based on the raw material powder. The total content of the oxides of the components (A) and (B) is preferably at least 80% by weight, more preferably at least 90% by weight, and further preferably at least 95% by weight.

The (C) sintering aid is an oxide of at least one element selected from among Group 2 elements and Group 4 elements.

Here, the sintering aid is preferably one that restrains precipitation of heterophase other than cubic crystals in the crystal structure of a terbium oxide-based ceramic. Specifically, it is said that terbium oxide, when used alone, undergoes a phase transition from cubic crystals to monoclinic crystals at approximately 1,400 to 1,600° C. Therefore, since heating to 1,400 to 1,600° C. is conducted at the time of sintering the rare earth oxide ceramic containing terbium oxide, a phase transition from monoclinic crystals to cubic crystals is inevitably generated at the time of sintering or at the time of cooling. If the monoclinic crystals partly remain without undergoing this phase transition, therefore, the remaining parts would become heterophase precipitates, which will cause scattering. In addition, since monoclinic crystals are anisotropic, they exhibit birefringence. For this reason, it is preferable to add a sintering aid that can smoothly undergo a phase transition from monoclinic crystals to cubic crystals. Examples of such a sintering aid include oxides of Group 4 elements such as titanium, zirconium, or hafnium, and oxides of Group 2 elements such as magnesium or calcium. Besides, an oxide of a Group 4 element and an oxide of a Group 2 element may be used simultaneously. These oxides do not exhibit absorption at wavelengths of approximately 1.06 μm, and are therefore preferable for the transparent ceramic of the present invention. In addition, the oxides of Group 4 elements, which are known as a stabilizer in sintering of yttria, are also effective as a stabilizer in the transparent ceramic of the present invention. Note that since the Group 2 elements such as magnesium and calcium are high in reaction activity because of their high ionic properties, and are easily soluble in a rare earth oxide on a solid solution basis.

Besides, oxides of other elements than the above-mentioned are unsuitable for use as a sintering aid in the present invention, since they have problems in that the oxides exhibit absorption at wavelengths of approximately 1.06 μm, that the elements are difficultly soluble in the rare earth oxide on a solid solution basis and therefore the oxides do not react as a sintering aid but are precipitated singly, that the elements are too high in activity and therefore the size of crystal grains would not be within an optimum range, or that the oxides gradually react with moisture in a long period of time and therefore the ceramic exhibits hygroscopicity and undergoes devitrification.

In the raw material powder as above, the sintering aid of the component (C), which prevents precipitation of heterophase other than the cubic crystals of the crystal structure of the terbium oxide-based ceramic, for example, an oxide of a Group 4 element such as titanium, zirconium, or hafnium, and/or a Group 2 element such as magnesium or calcium is preferably contained in an amount of more than 0.5 parts by weight and up to 5 parts by weight, more preferably at least 0.8 parts by weight and up to 5 parts by weight, and further preferably at least 1 part by weight and up to 4.8 parts by weight, based on 100 parts by weight of the total amount of the rare earth oxides of the components (A) and (B). If the amount of the component (C) is outside the above-mentioned range, the raw material powder may not satisfy the characteristics required for the material for a magneto-optical device, for example, the insertion loss at a wavelength of 1,064 nm inclusive of a reflection loss at an end face in a plane of at least 90% of a measurement surface in the thickness direction of a 10 mm-thick sample of the transparent ceramic may be more than 0.97 dB. Specifically, if the amount of the component (C) is up to 0.5 parts by weight, it may be impossible to obtain a stable effect of the component (C) as a sintering aid; besides, if the amount is more than 5 parts by weight, the element in the component (C) may fail to be dissolved in the rare earth oxide on a solid solution basis and the component (C) may be precipitated singly, which will possibly cause scattering.

Note that the oxide of the Group 4 element may be utilized alone as the sintering aid, or the oxide of the Group 2 element may be utilized alone as the sintering aid, or the Group 4 element oxide and the Group 2 element oxide may be simultaneously contained in the raw material powder. Since the Group 4 element is present as tetravalent ions and the Group 2 element is present as bivalent ions, doping of both the elements in the form of so-called charge compensation (in which the valence of the total amount of ions is compensated for) by simultaneous addition of both the elements makes it possible to restrain the generation of ionic defects.

The primary particle diameter of the raw material powder for use in the first step is preferably 100 to 2,000 nm, more preferably 200 to 1,000 nm. If the primary particle diameter is less than 100 nm, the powder is difficult to handle, which may cause a problem, for example, that molding is difficult, or that the density of a green compact is so low that the shrinkage factor is great and cracking is liable to occur at the time of sintering. If the primary particle diameter exceeds 2,000 nm, on the other hand, the raw material may be poor in sinterability, and it may be difficult to obtain a transparent sintered body with a high density. Note that measurement of the primary particle diameter involves obtaining an average value of long diameters of 100 primary particles in an arbitrary field of view at the time of observation under a scanning electron microscope or an optical microscope.

(Second Step)

Next, in order to render the particle diameters uniform, at least any of a dispersant such as ammonium polyacrylate or ammonium polycarboxylate and a binder such as methyl cellulose or polyvinyl alcohol, is optionally added to the raw material powder (co-precipitated raw material) obtained above, and, further, while using pure water or ethyl alcohol as a solvent, general mixing and pulverization by a ball mill is conducted for several hours to ten and several hours.

A slurry thus obtained is subjected to removal of the solvent and granulation by use of a spray dryer, to mold granules of several tens of micrometers in size, after which the granules thus prepared are subjected to primary molding by a predetermined mold and secondary molding by CIP (Cold Isostatic Press), whereby a molded body can be produced preferably.

(Third Step)

In a third step, for the purpose of removing the added organic components (the dispersant and the binder), the molded body is calcined at 400 to 1,000° C., to obtain a calcined body. The calcination atmosphere may be the atmospheric air or an oxidizing atmosphere. The calcination time, which depends on the calcination temperature, may generally be approximately 60 to 180 minutes. In this step, the relative density of the calcined body is desirably at least 50%.

(Fourth Step)

In a fourth step, the calcined body is preferably fired at 1,400 to 1,800° C., more preferably 1,400 to 1,600° C., to obtain a fired body. The firing atmosphere is not particularly limited so long as $Tb_4O_7$ of terbium oxide is changed into $Tb_2O_3$ in the atmosphere, in other words, so long as the atmosphere is a non-oxidizing atmosphere. For example, any of vacuum ($10^2$ Pa to $10^{-5}$ Pa), a reducing atmosphere, an inert gas atmosphere and the like may be used. Note that in the case of carrying out firing in a vacuum, a reduced pressure condition of $10^2$ Pa to $10^{-5}$ Pa can be used. The firing time, which depends on the firing temperature, may generally be approximately 30 to 480 minutes. In this step, the relative density of the fired body is desirably at least 90%.

(Fifth Step)

In a fifth step, the fired body is preferably fired under pressure at 1,400 to 1,800° C., more preferably 1,400 to 1,600° C., to obtain a pressure-fired body. The method for pressure firing is not particularly limited, and may, for example, be any of a HP (Hot Press) method, a HIP (Hot Isostatic Press) method and the like. Especially, in the present invention, the HIP method in which pressure is exerted uniformly and therefore the treated body is not liable to be strained can be used preferably. For instance, using argon gas as a pressure medium and setting the pressure in the range of 19 to 196 MPa, pressure firing may be conducted at 1,400 to 1,800° C. for at least one hour, whereby a transparent ceramic (transparent pressure-fired body) can be obtained.

(Other Step (Sixth Step))

In the present invention, if necessary, the pressure-fired body obtained above may further be heat-treated in a non-oxidizing atmosphere (an atmosphere that does not contain oxygen) at 1,500 to 2,000° C. (this step is referred to as an annealing step).

The transparent ceramic obtained as above has, on outer peripheral portions of the ceramic, carbon or tungsten as heater material coming from a heater and aluminum, silicon, calcium or the like as heat-insulating material which are deposited as impurities in the calcination step as the third step, the firing step as the fourth step, the pressure firing step as the fifth step and the annealing step as the sixth step, causing devitrification of the transparent ceramic. In view of this, both end faces in the thickness direction of the transparent ceramic must be removed by chemical etching, mechanical grinding or polishing.

Where the chemical etching is conducted using an acidic aqueous solution, the acid may be an inorganic acid such as hydrochloric acid, nitric acid, sulfuric acid and phosphoric acid or an organic acid such as malic acid and citric acid. For instance, in the case of hydrochloric acid, the outer peripheral surfaces of the transparent ceramic can be etched away in a thickness amount of several hundreds of micrometers by heating to a temperature of at least 60° C.

Where the mechanical grinding is conducted, an outer peripheral surface may be ground by a centerless grinding machine or a cylindrical grinding machine, and both end faces may be ground by a surface grinding machine, the thickness of the layer ground away being several hundreds of micrometers to several millimeters.

Where the polishing is applied, a layer of several hundreds of micrometers to several millimeters in thickness may be polished away, by rough polishing using a diamond slurry, an SiC slurry or the like, followed by fine polishing using colloidal silica or the like.

By such chemical etching, mechanical grinding or polishing, an optical element excellent in optical characteristics can be formed.

According to the method for producing a transparent ceramic of the present invention, optical defects such as a Tb-rich phase or $ZrO_2$ in the ceramic crystal structure can be lessened, the uniformity of the crystal structure can be enhanced, and material characteristics for magneto-optical devices can be improved.

[Transparent Ceramic]

A transparent ceramic according to the present invention is the transparent ceramic produced by the aforementioned method for producing a transparent ceramic according to the present invention, and contains a rare earth oxide including terbium oxide (chemical formula: $Tb_2O_3$) and at least one other rare earth oxide selected from among yttrium oxide, scandium oxide and oxides of lanthanide rare earth elements (excluding terbium), the molar ratio of terbium oxide being at least 40 mol % and the balance being the other rare earth oxide, and a sintering aid including an oxide of at least one element selected from among Group 2 elements and Group 4 elements.

Specifically, the transparent ceramic of the present invention contains an oxide represented by the following formula (I) as a main constituent rare earth oxide.

$$(Tb_xR_{1-x})_2O_3 \qquad (I)$$

(In the formula (I), x is 0.4≤x<1.0, and R is at least one other rare earth element selected from among yttrium, scandium and lanthanide rare earth elements (excluding terbium).)

In the above formula (I), R is not particularly limited so long as it contains at least one rare earth element selected from the group consisting of yttrium, scandium, lanthanum, europium, gadolinium, ytterbium, holmium and lutetium; besides, R may contain other element such as erbium and thulium. It is to be noted here, however, that it is most preferable for R to consist only of at least one rare earth element selected from the group consisting of yttrium, scandium, lanthanum, europium, gadolinium, ytterbium, holmium and lutetium, without containing other element. Here, R may be a single element alone, or a plurality of R's may be contained in an arbitrary ratio. Besides, among these elements, preferred as R are yttrium, scandium and lutetium, from the viewpoint of availability of starting material.

In the formula (I), x is at least 0.4 and less than 1.0. In other words, the rare earth oxide represented by the formula (I) contains $Tb_2O_3$ in an amount in terms of molar ratio of at least 40 mol %. When x is less than 0.4, it is impossible to obtain a high Verdet constant.

In addition, x is preferably at least 0.4 and up to 0.8, and more preferably at least 0.45 and up to 0.75. When x is in the above-mentioned range, a high Verdet constant is obtained, and, further, excellent transparency is obtained, which is preferable. Particularly, where x is up to 0.8, generation of cracking during cooling after crystal growth is restrained, and a situation in which the crystal becomes cloudy can be restrained, which is preferable.

Besides, the transparent ceramic of the present invention contains, together with the above-mentioned rare earth oxide, a sintering aid including an oxide of at least one element selected from among Group 2 elements and Group 4 elements. This sintering aid is preferably an oxide of at least one element selected from among titanium, zirconium, hafnium, calcium and magnesium.

The content of the sintering aid including any of these oxides is preferably more than 0.5 parts by weight and up to 5 parts by weight, more preferably at least 0.8 parts by weight and up to 5 parts by weight, and further preferably at least 1 part by weight and up to 4.8 parts by weight. If the content is up to 0.5 parts by weight, it may be impossible to obtain a stable effect of the sintering aid, and the insertion loss may exceed 0.97 dB. On the other hand, where the content is more than 5 parts by weight, the sintering aid component may fail to be dissolved on a solid solution basis and may be precipitated singly, causing scattering of laser light, and in this case also, the insertion loss may exceed 0.97 dB.

The transparent ceramic of the present invention is produced using a raw material powder containing (A) terbium oxide, (B) at least one other rare earth oxide selected from among yttrium oxide, scandium oxide and lanthanide rare earth oxides (excluding terbium oxide), and (C) a sintering aid including an oxide of at least one element selected from among Group 2 elements and Group 4 elements, and is produced by the aforementioned three-component co-precipitation method. As a result, generation of optical defects such as a Tb-rich phase and $ZrO_2$ in the ceramic crystal structure is restrained, and material characteristics for magneto-optical devices are improved, as compared to the cases of ceramics produced by the conventional production methods.

Specifically, in the transparent ceramic of the present invention, the insertion loss at a wavelength of 1,064 nm inclusive of a reflection loss at an end face in a plane of at least 90% in terms of area ratio of a measurement surface in the thickness direction of a 10 mm-thick sample is preferably up to 0.97 dB, more preferably up to 0.96 dB. If the insertion loss exceeds 0.97 dB, scattering of light on crystal grains or at grain boundaries is very severe, or light absorption at crystal grains is very large, that is, a thermal lens is generated. Therefore, it is difficult to apply the transparent ceramic to, for example, use in a laser processing machine for high power (e.g., an output of 20 W) which is assumed in the present invention.

In measuring the insertion loss, the ceramic is placed on a V-shaped block, coherent light having a wavelength of 1,064 nm and a power of several milliwatts is applied perpendicularly to the ceramic, and light intensity is measured by a semiconductor photodetector. In this instance, the light intensity in the case where the ceramic is not inserted is used as a reference, and a lowering in light intensity relative to the reference is expressed in dB unit, to obtain the insertion loss. Note that the ceramic used here is a sample measuring 6 mm in diameter and 10 mm in thickness, which has been polished to have a surface roughness Rms of up to 1 nm, a surface flatness of up to $\lambda/4$ ($\lambda$=633 nm), and a both end face parallelism of up to 0.5°.

Note that Rms (Root-mean-square) means a root-mean-square roughness obtained as a square root of a mean of squares of deviations relative to an arithmetic mean of sectional profile in a reference length.

In addition, the V-shaped block on which the ceramic is placed can be moved in a direction perpendicular to the incident light, whereby in-plane distribution of the ceramic can be measured. Accordingly, the in-plane distribution for at least 90% of the measurement surface is the result of measurement at each measurement point while the V-shaped block is being moved to 95% of the sample diameter.

Besides, in the transparent ceramic of the present invention, the extinction ratio at a wavelength of 1,064 nm in a plane of at least 90% of the measurement surface in the thickness direction of a 10 mm-thick sample is preferably at least 35 dB, more preferably at least 36 dB.

In measuring the extinction ratio, the ceramic is placed on a V-shaped block, coherent light having a wavelength of 1,064 nm and a power of 20 mW is converged to a diameter of 0.3 mm by an objective lens with a magnification factor of 10 times, and is applied perpendicularly to the ceramic through a polarizer. In this instance, the light is in the state of linearly polarized light. The light intensity of the light transmitted through the ceramic is measured by a semiconductor photodetector, in a condition where a polarizer rotated by 90 degrees in relation to the above-mentioned polarizer is disposed between the ceramic and the photodetector. In this case, let the light intensity in the case where the ceramic is not inserted be $I_0$ (mW), and let the light intensity in the case where the ceramic is inserted be I (mW), then the extinction ratio is expressed by the following formula.

$$\text{Extinction ratio} = -10 \log(I/I_0)$$

Note that the in-plane distribution for at least 90% of the measurement surface is measured at each measurement point while the V-shaped block is being moved to 95% of the sample diameter.

In addition, in the case where laser light having a wavelength of 1,064 nm is applied with a beam diameter of 1.6 mm and in the thickness direction of a 10 mm-thick sample of the transparent ceramic of the present invention, the maximum value of incidence power of the laser light at which the thermal lens is not generated is preferably at least 15 W, more preferably at least 20 W, and further preferably at least 25 W.

The thermal lens as mentioned above is determined by reading a maximum incidence power at which a change in focal distance, at the time when light with a predetermined incidence power is emitted as 1.6 mm space light and the transparent ceramic is inserted in the optical path as a Faraday rotator in a configuration wherein polarization elements are set on the front side and rear side of the sample of the ceramic, is up to 0.1 m.

[Magneto-Optical Device]

The transparent ceramic of the present invention is preferable for use in magneto-optical devices. Especially, the transparent ceramic of the present invention is preferably used as a Faraday rotator of an optical isolator in a 1.06 μm wavelength region (1,064±40 nm).

FIG. 1 is a sectional schematic view indicating an example of an optical isolator, which is a magneto-optical device having a Faraday rotator as an optical element.

In FIG. 1, an optical isolator 100 has a Faraday rotator 110, and a polarizer 120 and an analyzer 130 which include a polarizing material are disposed on the front side and rear side of the Faraday rotator 110. In addition, the optical isolator 100 preferably has a configuration wherein the polarizer 120, the Faraday rotator 110 and the analyzer 130 are disposed in this order on an optical axis 112, and a magnet 140 is placed on at least one of side surfaces of these optical components, the magnet 140 being accommodated inside a housing 150.

In addition, the isolator is used preferably for a fiber laser for a processing machine. Specifically, the isolator is preferable for preventing the occurrence of a situation in which reflected light of laser light emitted from a laser element returns to the element to make the oscillation unstable.

EXAMPLES

The present invention will be described more specifically below by indicating Examples and Comparative Examples, but the invention is not limited to these Examples.

Example 1

First, as starting materials for rare earth oxides, a terbium oxide powder ($Tb_2O_3$, purity: at least 99.9% by weight) and a yttrium oxide powder ($Y_2O_3$, purity: at least 99.9% by weight) made by Shin-Etsu Chemical Co., Ltd. were prepared, and were weighed such as to obtain a $Tb_2O_3$:$Y_2O_3$ molar ratio of 60:40. Further, as a starting material for a sintering aid, a zirconium oxide ($ZrO_2$) powder (purity: at least 99.9% by weight) made by Daiichi Kigenso Kagaku Kogyo Co., Ltd. was weighed such as to obtain six levels of content in the range of 0.4 to 5.2 parts by weight, based on 100 parts by weight of the total amount of the rare earth oxides. These three starting materials, in the state of six kinds of mixed starting materials with the sintering aid content varied to six levels, were each dissolved in a 5N aqueous nitric acid solution.

Next, while stirring each of the resulting aqueous solutions, aqueous ammonia ($NH_4OH$) was added dropwise thereto at a constant rate to neutralize the mixed starting material, then aqueous ammonia was further added dropwise to render the aqueous solution basic with a pH of 9 to 10, thereby precipitating (co-precipitating) a hydroxide (chemical formula: $(Tb_{0.6}Y_{0.4})(OH)_3$ and $Zr(OH)_4$).

Subsequently, an aqueous ammonium hydrogen carbonate solution ($NH_4HCO_3$) was added dropwise to the hydroxide precipitate-containing system, followed by aging for one hour. Thereafter, aqueous ammonia was further added to the system, to effect complete precipitation, then the precipitate was collected by filtration and rinsed with ultrapure water, and was dried. The dried powder thus obtained was placed in an aluminum crucible, and was subjected to thermal dehydration in atmospheric air at 700° C. for 3 hours, to obtain a raw material powder.

Next, each raw material powder thus obtained was admixed further with effective amounts of ethyl cellulose and polyvinyl alcohol adopted as a dispersant and a binder, the admixture was mixed in a pot mill to obtain a mixture, and then the mixture was spray dried, to obtain granules having a particle diameter of several tens of micrometers. The granules were subjected to molding by use of a mold as primary molding, and thereafter to molding by a cold isostatic pressing (CIP) method at a pressure of 200 MPa as second molding, to obtain a molded body.

Each molded body thus obtained was calcined at 1,000° C. in an oxygen atmosphere, and then fired at 1,700 to 1,750° C. in a vacuum of $5\times10^{-2}$ Pa in a vacuum furnace for 8 hours. Further, each sintered body thus obtained was treated by a hot isostatic press (HIP) method at 1,800° C. and a pressure of 100 MPa for 10 hours. In this manner, six kinds of ceramic samples having a diameter of 6 mm were obtained.

Each of the sintered ceramic bodies thus obtained was subjected to grinding and polishing such as to have a length of 10 mm. Next, both optical end surfaces of each sample were subjected to final optical polishing with an optical surface accuracy of $\lambda/8$ ($\lambda=633$ nm), and further an antireflection film designed to have a center wavelength of 1,064 nm was formed thereon by coating.

As illustrated in FIG. 1, polarization elements are set on the front side and rear side of each ceramic sample obtained above, and a hollow cylindrical neodymium-iron-boron magnet was placed thereover such that the ceramic sample is located at the center of the cylinder. While using a high power laser (beam diameter: 1.6 mm) made by IPG Photonics Japan Ltd., a high power laser beam with a wavelength of 1,064 nm was applied from both end surfaces of the ceramic sample, and measurement was conducted as to insertion loss, total transmittance, scattering transmittance, extinction ratio, Verdet constant, and maximum value of incident power at which a thermal lens is not generated.

(Method for Measuring Insertion Loss)

In measuring the insertion loss, the ceramic is placed on a V-shaped block, and coherent light having a wavelength of 1.064 μm and a power of 20 mW is converged to a diameter of 0.3 mm by an objective lens of a magnification of 10 times, and is applied perpendicularly to the ceramic. The light transmitted through the ceramic is subjected to measurement of light intensity by a semiconductor photodetector. In this case, let the light intensity measured with the ceramic not inserted be $I_0$ (mW) and let the light intensity measured with the ceramic inserted be $I_1$ (mW), then the insertion loss is expressed by the following formula.

Insertion Loss=$-10 \log(I_1/I_0)$ (Method for Measuring Total Transmittance and Scattering Transmittance)

Total transmittance was measured by use of an ultraviolet-visible spectrophotometer V-670 made by JASCO Corporation. Light was subjected to multiple reflection by an integrating sphere having an internal wall coated with a high-reflectance material to render the light uniform, the intensity of the light inclusive of, for example, light scattered due to turbidity in the sample was put to measurement, and the total transmittance was determined based on the following formula. In this instance, the wavelength is 1,064 nm.

Total Transmittance=$I/I_0 \times 100$ (In the formula, I represents the transmitted light intensity (the intensity of the light transmitted through a 10 mm-long sample), and $I_0$ represents the incident light intensity.)

Scattering transmittance was measured by use of an ultraviolet-visible spectrophotometer V-670 made by JASCO Corporation. The above-mentioned integrating sphere is placed on an optical path during measurement. In this case, that part of the integrating sphere which corresponds to the optical path for measurement is opened, such that the light passing rectilinearly goes out of the integrating sphere, but the light scattered due to turbidity in the sample is trapped by the integrating sphere. The intensity of the light trapped by the integrating sphere was put to measurement, and the scattering transmittance was determined based on the following formula. In this instance, the wavelength is 1,064 nm.

Scattering Transmittance=$I/I_0 \times 100$ (In the formula, I represents the scattering light intensity (the intensity of the light scattered by a 10 mm-long sample), and $I_0$ represents the incident light intensity.)
(Method for Measuring Extinction Ratio)

In measuring extinction ratio, the ceramic is placed on a V-shaped block, coherent light having a wavelength of 1.064 μm and a power of 20 mW is converged to a diameter of 0.3 mm by an objective lens of a magnification factor of 10 times, and is applied perpendicularly to the ceramic through a polarizer. In this instance, the light is in the state of linearly polarized light. The light intensity of the light transmitted through the ceramic is measured by a semiconductor photodetector, in a condition where a polarizer rotated by 90 degrees relative to the above-mentioned polarizer is inserted in between the ceramic and the photodetector. In this case, let the light intensity measured with the ceramic not inserted be $I_0$ (mW), and let the light intensity measured with the ceramic inserted be I (mW), then the extinction ratio is represented by the following formula.

Extinction Ratio=$-10 \log(I/I_0)$ (Method for Measuring Verdet Constant)

Verdet constant V was determined based on the following formula. Note that as the magnitude (H) of the magnetic field applied to the sample, a value calculated from the dimensions of the measurement system, residual magnetic flux density (Br) and coercive force (Hc) by simulation.

$\theta = V \times H \times L$ (In the formula, θ is Faraday rotation angle (min), V is Verdet constant, H is magnitude of magnetic field (Oe), and L is the length of Faraday rotator (in this case, 1 cm).)
(Method for Measuring Maximum Value of Incident Power at which Thermal Lens is not Generated)

High-power laser light having a wavelength of 1,064 nm is emitted as space light of a beam diameter of 1.6 mm, and beam waist position F0 (m) is measured by use of a beam profiler. Thereafter, the sample for measurement is placed in the space optical system, and beam waist position F1 (m) is measured for the light emitted in the same way. The change (ΔF) in the beam waist position in this case is represented by the following formula.

$\Delta F(m) = F0 - F1$

Note that while the change ΔF increases with an increase in input laser power, maximum incident laser power [W] when ΔF=up to 0.1 m was determined as a value at which thermal lens is negligible (a maximum value of incident power at which thermal lens is not generated).

Comparative Example 1A

First, as starting materials for rare earth oxides, a terbium oxide powder ($Tb_2O_3$, purity: at least 99.9% by weight) and a yttrium oxide powder ($Y_2O_3$, purity: at least 99.9% by weight) made by Shin-Etsu Chemical Co., Ltd. were prepared, and were weighed such as to obtain a $Tb_2O_3:Y_2O_3$ molar ratio of 60:40. Further, as a starting material for a sintering aid, a zirconium oxide ($ZrO_2$) powder (purity: at least 99.9% by weight) made by Daiichi Kigenso Kagaku Kogyo Co., Ltd. was weighed such as to obtain six levels of content in the range of 0.3 to 5.5 parts by weight, based on 100 parts by weight of the total amount of the rare earth oxides. Note that the terbium oxide powder, the yttrium oxide powder and the zirconium oxide powder each had a particle diameter (average primary particle diameter) of 0.1 to 1 μm.

These starting materials, in the state of six kinds of mixed starting materials with the sintering aid content varied to six levels, were each admixed further with effective amounts of ethyl cellulose and polyvinyl alcohol adopted as a dispersant and a binder, and each admixture was mixed in a pot mill. In this way, six kinds of mixtures were obtained. Each of the six mixtures was spray dried, to obtain granules having a particle diameter of several tens of micrometers. The granules were subjected to molding by use of a mold as primary molding, and thereafter to molding by a CIP method at a pressure of 200 MPa as secondary molding, to obtain a molded body.

Each molded body thus obtained was calcined at 1,000° C. in an oxygen atmosphere, and then fired at 1,650 to 1,700° C. in a vacuum of $5 \times 10^{-2}$ Pa in a vacuum furnace for 8 hours.

Further, each sintered body thus obtained was treated by a hot isostatic press (HIP) method at 1,800° C. and a pressure of 100 MPa for 10 hours. In this manner, six kinds of ceramic samples having a diameter of 6 mm were obtained.

Each of the sintered ceramic bodies thus obtained was subjected to grinding and polishing such as to have a length of 10 mm. Next, both optical end surfaces of each sample were subjected to final optical polishing with an optical surface accuracy of λ/8 (λ=633 nm), and further an antireflection film designed to have a center wavelength of 1,064 nm was formed thereon by coating. The samples thus treated were put to evaluation in the same manner as in Example 1.

Comparative Example 1B

First, as starting materials for rare earth oxides, a terbium oxide powder ($Tb_2O_3$, purity: at least 99.9% by weight) and a yttrium oxide powder ($Y_2O_3$, purity: at least 99.9% by weight) made by Shin-Etsu Chemical Co., Ltd. were prepared, and were weighed such as to obtain a $Tb_2O_3:Y_2O_3$ molar ratio of 60:40. The terbium oxide powder and the yttrium oxide powder were mixed with each other, and the mixture was dissolved in a 5N aqueous nitric acid solution.

Next, while stirring the resulting aqueous solution, aqueous ammonia ($NH_4OH$) was added dropwise thereto at a constant rate to neutralize the mixed starting material, then aqueous ammonia was further added dropwise to render the aqueous solution basic with a pH of 9 to 10, thereby precipitating (co-precipitating) a hydroxide (chemical formula: $(Tb_{0.6}Y_{0.4})(OH)_3$).

Subsequently, an aqueous ammonium hydrogen carbonate solution ($NH_4HCO_3$) was added dropwise to the hydroxide precipitate-containing system, followed by aging for one hour. Thereafter, aqueous ammonia was further added to the system, to effect complete precipitation, then the precipitate was collected by filtration and washed with ultrapure water, and was dried. The dried powder thus obtained was placed in an aluminum crucible, and was subjected to thermal dehydration in atmospheric air at 700° C. for 3 hours, to obtain a powder.

Next, as a sintering aid to be added to the above-obtained powder, a zirconium oxide ($ZrO_2$) powder (purity: at least 99.9% by weight) made by Daiichi Kigenso Kagaku Kogyo Co., Ltd. was weighed such as to obtain six levels of content in the range of 0.4 to 5.3 parts by weight, based on 100 parts by weight of the total amount of the rare earth oxides. Each of the six weighed amounts of zirconium oxide powder was added to the above-obtained powder, followed by further adding thereto effective amounts of ethyl cellulose and polyvinyl alcohol adopted as a dispersant and a binder, and by mixing in a pot mill. In this way, six kinds of mixtures were obtained. Each of the six kinds of mixtures was spray dried, to obtain granules having a particle diameter of several tens of micrometers. The granules were subjected to molding by use of a mold as primary molding, and thereafter to molding by a CIP method at a pressure of 200 MPa as secondary molding, to obtain a molded body.

Each molded body thus obtained was calcined at 1,000° C. in an oxygen atmosphere, and then fired at 1,650 to 1,700° C. in a vacuum of $5\times10^{-2}$ Pa in a vacuum furnace for 8 hours.

Further, each sintered body thus obtained was treated by a hot isostatic press (HIP) method at 1,800° C. and a pressure of 100 MPa for 10 hours. In this manner, six kinds of ceramic samples having a diameter of 6 mm were obtained.

Each of the sintered ceramic bodies thus obtained was subjected to grinding and polishing such as to have a length of 10 mm. Next, both optical end surfaces of each sample were subjected to final optical polishing with an optical surface accuracy of $\lambda/8$ ($\lambda=633$ nm), and further an antireflection film designed to have a center wavelength of 1,064 nm was formed thereon by coating. The samples thus treated were put to evaluation in the same manner as in Example 1.

The results of Example 1 and Comparative Examples 1A and 1B are indicated in Tables 1 to 3.

Each sample in Example 1 indicated optical characteristics improved as compared to those of samples in Comparative Examples 1A and 1B that have the corresponding composition.

TABLE 1

| | | | Example | | | | | |
|---|---|---|---|---|---|---|---|---|
| Three-component co-precipitation | | | 1-1 | 1-2 | 1-3 | 1-4 | 1-5 | 1-6 |
| Starting material | Terbium oxide | Molar ratio (%) | 60 | 60 | 60 | 60 | 60 | 60 |
| | Rare earth oxide 1 | Kind | $Y_2O_3$ | $Y_2O_3$ | $Y_2O_3$ | $Y_2O_3$ | $Y_2O_3$ | $Y_2O_3$ |
| | | Molar ratio (%) | 40 | 40 | 40 | 40 | 40 | 40 |
| | Rare earth oxide 2 | Kind | — | — | — | — | — | — |
| | | Molar ratio (%) | — | — | — | — | — | — |
| | Sintering aid 1 | Kind | $ZrO_2$ | $ZrO_2$ | $ZrO_2$ | $ZrO_2$ | $ZrO2$ | $ZrO_2$ |
| | | Content (parts by weight) | 0.4 | 0.7 | 1.2 | 2.8 | 4.7 | 5.2 |
| | Sintering aid 2 | Kind | — | — | — | — | — | — |
| | | Content (parts by weight) | — | — | — | — | — | — |
| Step | Thermal dehydration | Temperature (° C.) | 700 | 700 | 700 | 700 | 700 | 700 |
| | | Time (hour) | 3 | 3 | 3 | 3 | 3 | 3 |
| | Calcination | Temperature (° C.) | 1000 | 1000 | 1000 | 1000 | 1000 | 1000 |
| | | Atmosphere | Oxygen | Oxygen | Oxygen | Oxygen | Oxygen | Oxygen |
| | Firing | Temperature (° C.) | 1700 | 1700 | 1700 | 1700 | 1750 | 1750 |
| | | Time (hour) | 8 | 8 | 8 | 8 | 8 | 8 |
| | | Atmosphere | Vacuum | Vacuum | Vacuum | Vacuum | Vacuum | Vacuum |
| | HIP | Temperature (° C.) | 1800 | 1800 | 1800 | 1800 | 1800 | 1800 |
| | | Time (hour) | 10 | 10 | 10 | 10 | 10 | 10 |
| | | Pressure (MPa) | 100 | 100 | 100 | 100 | 100 | 100 |
| Evaluation results | Insertion loss (dB) | | 0.99 | 0.96 | 0.95 | 0.95 | 0.96 | 0.99 |
| | Total transmission (%) | | 78.5 | 80.1 | 80.7 | 80.5 | 80.3 | 78.7 |
| | Scattering transmission (%) | | 1.10 | 0.80 | 0.60 | 0.50 | 0.70 | 1.20 |
| | Extinction ratio (dB) | | 34.0 | 35.5 | 37.5 | 38.5 | 36.0 | 34.5 |
| | Verdet constant (minute/Oe · cm) | | 0.30 | 0.30 | 0.31 | 0.29 | 0.30 | 0.30 |
| | Thermal lens (W) | | 15 | 25 | 40 | 35 | 30 | 15 |

TABLE 2

| | | | Comparative Example | | | | | |
|---|---|---|---|---|---|---|---|---|
| Mixing of starting materials | | | 1A-1 | 1A-2 | 1A-3 | 1A-4 | 1A-5 | 1A-6 |
| Starting material | Terbium oxide | Molar ratio (%) | 60 | 60 | 60 | 60 | 60 | 60 |
| | Rare earth oxide 1 | Kind | $Y_2O_3$ | $Y_2O_3$ | $Y_2O_3$ | $Y_2O_3$ | $Y_2O_3$ | $Y_2O_3$ |
| | | Molar ratio (%) | 40 | 40 | 40 | 40 | 40 | 40 |
| | Rare earth oxide 2 | Kind | — | — | — | — | — | — |
| | | Molar ratio (%) | — | — | — | — | — | — |
| | Sintering aid 1 | Kind | $ZrO_2$ | $ZrO_2$ | $ZrO_2$ | $ZrO_2$ | $ZrO_2$ | $ZrO_2$ |
| | | Content (parts by weight) | 0.3 | 0.6 | 1.1 | 2.8 | 4.8 | 5.5 |

TABLE 2-continued

| | | | Comparative Example | | | | | |
|---|---|---|---|---|---|---|---|---|
| | Mixing of starting materials | | 1A-1 | 1A-2 | 1A-3 | 1A-4 | 1A-5 | 1A-6 |
| | Sintering aid 2 | Kind | — | — | — | — | — | — |
| | | Content (parts by weight) | — | — | — | — | — | — |
| Step | Thermal dehydration | Temperature (° C.) | 700 | 700 | 700 | 700 | 700 | 700 |
| | | Time (hour) | 3 | 3 | 3 | 3 | 3 | 3 |
| | Calcination | Temperature (° C.) | 1000 | 1000 | 1000 | 1000 | 1000 | 1000 |
| | | Atmosphere | Oxygen | Oxygen | Oxygen | Oxygen | Oxygen | Oxygen |
| | Firing | Temperature (° C.) | 1650 | 1650 | 1700 | 1700 | 1650 | 1700 |
| | | Time (hour) | 8 | 8 | 8 | 8 | 8 | 8 |
| | | Atmosphere | Vacuum | Vacuum | Vacuum | Vacuum | Vacuum | Vacuum |
| | HIP | Temperature (° C.) | 1800 | 1800 | 1800 | 1800 | 1800 | 1800 |
| | | Time (hour) | 10 | 10 | 10 | 10 | 10 | 10 |
| | | Pressure (MPa) | 100 | 100 | 100 | 100 | 100 | 100 |
| Evaluation results | Insertion loss (dB) | | 1.01 | 0.97 | 0.97 | 0.97 | 0.97 | 0.99 |
| | Total transmission (%) | | 78.0 | 79.5 | 79.7 | 80.0 | 79.8 | 78.5 |
| | Scattering transmission (%) | | 1.60 | 1.00 | 0.90 | 0.80 | 1.00 | 1.50 |
| | Extinction ratio (dB) | | 32.5 | 35.5 | 35.2 | 35.5 | 35.0 | 33.5 |
| | Verdet constant (minute/Oe · cm) | | 0.29 | 0.30 | 0.31 | 0.30 | 0.30 | 0.31 |
| | Thermal lens (W) | | 10 | 20 | 20 | 20 | 20 | 10 |

TABLE 3

| | | | Comparative Example | | | | | |
|---|---|---|---|---|---|---|---|---|
| | Two-component co-precipitation + Mixing of aid | | 1B-1 | 1B-2 | 1B-3 | 1B-4 | 1B-5 | 1B-6 |
| Starting material | Terbium oxide | Molar ratio (%) | 60 | 60 | 60 | 60 | 60 | 60 |
| | Rare earth oxide 1 | Kind | $Y_2O_3$ | $Y_2O_3$ | $Y_2O_3$ | $Y_2O_3$ | $Y_2O_3$ | $Y_2O_3$ |
| | | Molar ratio (%) | 40 | 40 | 40 | 40 | 40 | 40 |
| | Rare earth oxide 2 | Kind | — | — | — | — | — | — |
| | | Molar ratio (%) | — | — | — | — | — | — |
| | Sintering aid 1 | Kind | $ZrO_2$ | $ZrO_2$ | $ZrO_2$ | $ZrO_2$ | $ZrO_2$ | $ZrO_2$ |
| | | Content (parts by weight) | 0.4 | 0.8 | 1.0 | 2.5 | 4.5 | 5.3 |
| | Sintering aid 2 | Kind | — | — | — | — | — | — |
| | | Content (parts by weight) | — | — | — | — | — | — |
| Step | Thermal dehydration | Temperature (° C.) | 700 | 700 | 700 | 700 | 700 | 700 |
| | | Time (hour) | 3 | 3 | 3 | 3 | 3 | 3 |
| | Calcination | Temperature (° C.) | 1000 | 1000 | 1000 | 1000 | 1000 | 1000 |
| | | Atmosphere | Oxygen | Oxygen | Oxygen | Oxygen | Oxygen | Oxygen |
| | Firing | Temperature (° C.) | 1650 | 1650 | 1700 | 1700 | 1650 | 1700 |
| | | Time (hour) | 8 | 8 | 8 | 8 | 8 | 8 |
| | | Atmosphere | Vacuum | Vacuum | Vacuum | Vacuum | Vacuum | Vacuum |
| | HIP | Temperature (° C.) | 1800 | 1800 | 1800 | 1800 | 1800 | 1800 |
| | | Time (hour) | 10 | 10 | 10 | 10 | 10 | 10 |
| | | Pressure (MPa) | 100 | 100 | 100 | 100 | 100 | 100 |
| Evaluation results | Insertion loss (dB) | | 0.99 | 0.97 | 0.97 | 0.97 | 0.97 | 0.99 |
| | Total transmission (%) | | 78.2 | 79.5 | 80.0 | 80.2 | 79.8 | 77.5 |
| | Scattering transmission (%) | | 1.50 | 1.00 | 0.90 | 0.90 | 0.90 | 1.60 |
| | Extinction ratio (dB) | | 32.5 | 35.2 | 35.5 | 36.0 | 36.2 | 33.0 |
| | Verdet constant (minute/Oe · cm) | | 0.30 | 0.29 | 0.30 | 0.30 | 0.31 | 0.30 |
| | Thermal lens (W) | | 10 | 20 | 25 | 25 | 20 | 10 |

Example 2

Sintered ceramic bodies were produced and subjected to evaluation in the same manner as in Example 1, except that hafnium oxide ($HfO_2$) was used as the sintering aid and its content was varied to six levels.

Comparative Example 2A

Sintered ceramic bodies were produced and subjected to evaluation in the same manner as in Comparative Example 1A, except that hafnium oxide was used as the sintering aid and its content was varied to six levels.

Comparative Example 2B

Sintered ceramic bodies were produced and subjected to evaluation in the same manner as in Comparative Example 1B, except that hafnium oxide was used as the sintering aid and its content was varied to six levels.

The results of Example 2 and Comparative Examples 2A and 2B are set forth in Table 4 to Table 6.

Each sample in Example 2 indicated optical characteristics improved as compared to those of samples in Comparative Examples 2A and 2B that have the corresponding composition.

TABLE 4

| | | | Example | | | | | |
|---|---|---|---|---|---|---|---|---|
| | Three-component co-precipitation | | 2-1 | 2-2 | 2-3 | 2-4 | 2-5 | 2-6 |
| Starting material | Terbium oxide | Molar ratio (%) | 60 | 60 | 60 | 60 | 60 | 60 |
| | Rare earth oxide 1 | Kind | $Y_2O_3$ | $Y_2O_3$ | $Y_2O_3$ | $Y_2O_3$ | $Y_2O_3$ | $Y_2O_3$ |
| | | Molar ratio (%) | 40 | 40 | 40 | 40 | 40 | 40 |
| | Rare earth oxide 2 | Kind | — | — | — | — | — | — |
| | | Molar ratio (%) | — | — | — | — | — | — |
| | Sintering aid 1 | Kind | $HfO_2$ | $HfO_2$ | $HfO_2$ | $HfO_2$ | $HfO_2$ | $HfO_2$ |
| | | Content (parts by weight) | 0.3 | 0.6 | 1.2 | 2.8 | 4.5 | 5.2 |
| | Sintering aid 2 | Kind | — | — | — | — | — | — |
| | | Content (parts by weight) | — | — | — | — | — | — |
| Step | Thermal dehydration | Temperature (° C.) | 700 | 700 | 700 | 700 | 700 | 700 |
| | | Time (hour) | 3 | 3 | 3 | 3 | 3 | 3 |
| | Calcination | Temperature (° C.) | 1000 | 1000 | 1000 | 1000 | 1000 | 1000 |
| | | Atmosphere | Oxygen | Oxygen | Oxygen | Oxygen | Oxygen | Oxygen |
| | Firing | Temperature (° C.) | 1700 | 1700 | 1700 | 1700 | 1750 | 1750 |
| | | Time (hour) | 8 | 8 | 8 | 8 | 8 | 8 |
| | | Atmosphere | Vacuum | Vacuum | Vacuum | Vacuum | Vacuum | Vacuum |
| | HIP | Temperature (° C.) | 1800 | 1800 | 1800 | 1800 | 1800 | 1800 |
| | | Time (hour) | 10 | 10 | 10 | 10 | 10 | 10 |
| | | Pressure (MPa) | 100 | 100 | 100 | 100 | 100 | 100 |
| Evaluation results | Insertion loss (dB) | | 0.99 | 0.96 | 0.95 | 0.96 | 0.97 | 1.00 |
| | Total transmiission (%) | | 78.2 | 80.0 | 80.5 | 80.4 | 80.4 | 78.5 |
| | Scattering transmission (%) | | 1.20 | 0.85 | 0.65 | 0.55 | 0.60 | 1.10 |
| | Extinction ratio (dB) | | 33.0 | 35.0 | 36.5 | 37.5 | 37.0 | 34.0 |
| | Verdet constant (minute/Oe · cm) | | 0.30 | 0.30 | 0.31 | 0.30 | 0.29 | 0.30 |
| | Thermal lens (W) | | 15 | 30 | 45 | 50 | 40 | 15 |

TABLE 5

| | | | Comparative Example | | | | | |
|---|---|---|---|---|---|---|---|---|
| | Mixing of starting materials | | 2A-1 | 2A-2 | 2A-3 | 2A-4 | 2A-5 | 2A-6 |
| Starting material | Terbium oxide | Molar ratio (%) | 60 | 60 | 60 | 60 | 60 | 60 |
| | Rare earth oxide 1 | Kind | $Y_2O_3$ | $Y_2O_3$ | $Y_2O_3$ | $Y_2O_3$ | $Y_2O_3$ | $Y_2O_3$ |
| | | Molar ratio (%) | 40 | 40 | 40 | 40 | 40 | 40 |
| | Rare earth oxide 2 | Kind | — | — | — | — | — | — |
| | | Molar ratio (%) | — | — | — | — | — | — |
| | Sintering aid 1 | Kind | $HfO_2$ | $HfO_2$ | $HfO_2$ | $HfO_2$ | $HfO_2$ | $HfO_2$ |
| | | Content (parts by weight) | 0.3 | 0.7 | 1.2 | 2.8 | 4.7 | 5.4 |
| | Sintering aid 2 | Kind | — | — | — | — | — | — |
| | | Content (parts by weight) | — | — | — | — | — | — |
| Step | Thermal dehydration | Temperature (° C.) | 700 | 700 | 700 | 700 | 700 | 700 |
| | | Time (hour) | 3 | 3 | 3 | 3 | 3 | 3 |
| | Calcination | Temperature (° C.) | 1000 | 1000 | 1000 | 1000 | 1000 | 1000 |
| | | Atmosphere | Oxygen | Oxygen | Oxygen | Oxygen | Oxygen | Oxygen |
| | Firing | Temperature (° C.) | 1650 | 1650 | 1700 | 1700 | 1650 | 1700 |
| | | Time (hour) | 8 | 8 | 8 | 8 | 8 | 8 |
| | | Atmosphere | Vacuum | Vacuum | Vacuum | Vacuum | Vacuum | Vacuum |
| | HIP | Temperature (° C.) | 1800 | 1800 | 1800 | 1800 | 1800 | 1800 |
| | | Time (hour) | 10 | 10 | 10 | 10 | 10 | 10 |
| | | Pressure (MPa) | 100 | 100 | 100 | 100 | 100 | 100 |
| Evaluation results | Insertion loss (dB) | | 1.02 | 0.97 | 0.97 | 0.97 | 0.97 | 1.00 |
| | Total transmission (%) | | 78.5 | 79.7 | 79.8 | 80.0 | 79.7 | 79.0 |
| | Scattering transmission (%) | | 1.60 | 1.00 | 0.95 | 0.85 | 1.00 | 1.40 |
| | Extinction ratio (dB) | | 32.0 | 35.0 | 35.2 | 35.2 | 35.0 | 33.8 |
| | Verdet constant (minute/Oe · cm) | | 0.29 | 0.30 | 0.30 | 0.31 | 0.30 | 0.29 |
| | Thermal lens (W) | | 10 | 20 | 20 | 20 | 20 | 10 |

TABLE 6

| | | Two-component co-precipitation + Mixing of aid | Comparative Example | | | | | |
|---|---|---|---|---|---|---|---|---|
| | | | 2B-1 | 2B-2 | 2B-3 | 2B-4 | 2B-5 | 2B-6 |
| Starting material | Terbium oxide | Molar ratio (%) | 60 | 60 | 60 | 60 | 60 | 60 |
| | Rare earth oxide 1 | Kind | $Y_2O_3$ | $Y_2O_3$ | $Y_2O_3$ | $Y_2O_3$ | $Y_2O_3$ | $Y_2O_3$ |
| | | Molar ratio (%) | 40 | 40 | 40 | 40 | 40 | 40 |
| | Rare earth oxide 2 | Kind | — | — | — | — | — | — |
| | | Molar ratio (%) | — | — | — | — | — | — |
| | Sintering aid 1 | Kind | $HfO_2$ | $HfO_2$ | $HfO_2$ | $HfO_2$ | $HfO_2$ | $HfO_2$ |
| | | Content (parts by weight) | 0.4 | 0.8 | 1.3 | 2.5 | 4.5 | 5.3 |
| | Sintering aid 2 | Kind | — | — | — | — | — | — |
| | | Content (parts by weight) | — | — | — | — | — | — |
| Step | Thermal dehydration | Temperature (° C.) | 700 | 700 | 700 | 700 | 700 | 700 |
| | | Time (hour) | 3 | 3 | 3 | 3 | 3 | 3 |
| | Calcination | Temperature (° C.) | 1000 | 1000 | 1000 | 1000 | 1000 | 1000 |
| | | Atmosphere | Oxygen | Oxygen | Oxygen | Oxygen | Oxygen | Oxygen |
| | Firing | Temperature (° C.) | 1650 | 1650 | 1700 | 1700 | 1650 | 1700 |
| | | Time (hour) | 8 | 8 | 8 | 8 | 8 | 8 |
| | | Atmosphere | Vacuum | Vacuum | Vacuum | Vacuum | Vacuum | Vacuum |
| | HIP | Temperature (° C.) | 1800 | 1800 | 1800 | 1800 | 1800 | 1800 |
| | | Time (hour) | 10 | 10 | 10 | 10 | 10 | 10 |
| | | Pressure (MPa) | 100 | 100 | 100 | 100 | 100 | 100 |
| Evaluation results | | Insertion loss (dB) | 0.99 | 0.97 | 0.97 | 0.97 | 0.97 | 0.99 |
| | | Total transmission (%) | 78.5 | 79.2 | 79.5 | 79.8 | 79.5 | 77.8 |
| | | Scattering transmission (%) | 1.40 | 1.00 | 0.95 | 0.90 | 0.95 | 1.55 |
| | | Extinction ratio (dB) | 32.0 | 35.0 | 35.0 | 35.2 | 35.0 | 33.0 |
| | | Verdet constant (minute/Oe · cm) | 0.30 | 0.30 | 0.29 | 0.30 | 0.31 | 0.30 |
| | | Thermal lens (W) | 10 | 20 | 20 | 20 | 20 | 10 |

Examples 3-11

Rare earth oxide transparent ceramics containing terbium oxide were produced in the same manner as in Example 1, except that the starting materials and conditions were changed to those indicated in Table 7 to Table 15, and the transparent ceramics were subjected to measurement of optical characteristics such as insertion loss.

Examples 3 and 4 are examples in which the molar ratio of terbium oxide and yttrium oxide and the zirconium oxide content were changed from those in Example 1.

Examples 5 and 6 are examples in which the molar ratio of terbium oxide and yttrium oxide and the hafnium oxide content were changed from those in Example 2.

Example 7 is an example in which the molar ratio of terbium oxide and yttrium oxide was changed to 70:30 from the value in Example 1, and, further, titanium oxide ($TiO_2$) was used as the sintering aid and its content was changed.

Example 8 is an example in which a combination of terbium oxide and lutetium oxide ($Lu_2O_3$) was used in a molar ratio of 80:20 in place of the combination (and molar ratio) in Example 1, and, further, the zirconium oxide content was changed.

Example 9 is an example in which a combination of terbium oxide and scandium oxide ($Sc_2O_3$) was used in a molar ratio of 70:30 in place of the combination (and molar ratio) in Example 1, and, further, hafnium oxide ($HfO_2$) was used as the sintering aid and its content was changed.

Example 10 is an example in which a combination of terbium oxide, yttrium oxide and gadolinium oxide ($Gd_2O_3$) was used in a molar ratio of 60:10:30 in place of the combination (and molar ratio) in Example 1, and titanium oxide ($TiO_2$) was used as the sintering aid and its content was changed.

Example 11 is an example in which the molar ratio of terbium oxide and yttrium oxide was changed to 50:50 from the value in Example 1, and, further, a combination of zirconium oxide and titanium oxide ($TiO_2$) was used as the sintering aid and its content was changed.

All the results of the just-mentioned examples are collectively set forth in Table 7 to Table 15.

TABLE 7

| | | Three-component co-precipitation | Example | | | | | |
|---|---|---|---|---|---|---|---|---|
| | | | 3-1 | 3-2 | 3-3 | 3-4 | 3-5 | 3-6 |
| Starting material | Terbium oxide | Molar ratio (%) | 40 | 40 | 40 | 40 | 40 | 40 |
| | Rare earth oxide 1 | Kind | $Y_2O_3$ | $Y_2O_3$ | $Y_2O_3$ | $Y_2O_3$ | $Y_2O_3$ | $Y_2O_3$ |
| | | Molar ratio (%) | 60 | 60 | 60 | 60 | 60 | 60 |
| | Rare earth oxide 2 | Kind | — | — | — | — | — | — |
| | | Molar ratio (%) | — | — | — | — | — | — |
| | Sintering aid 1 | Kind | $ZrO_2$ | $ZrO_2$ | $ZrO_2$ | $ZrO_2$ | $ZrO_2$ | $ZrO_2$ |
| | | Content (parts by weight) | 0.4 | 0.8 | 1.2 | 3.0 | 4.5 | 5.3 |
| | Sintering aid 2 | Kind | — | — | — | — | — | — |
| | | Content (parts by weight) | — | — | — | — | — | — |

TABLE 7-continued

|  |  |  | Example | | | | | |
|---|---|---|---|---|---|---|---|---|
|  |  | Three-component co-precipitation | 3-1 | 3-2 | 3-3 | 3-4 | 3-5 | 3-6 |
| Step | Thermal dehydration | Temperature (° C.) | 700 | 700 | 700 | 700 | 700 | 700 |
|  |  | Time (hour) | 3 | 3 | 3 | 3 | 3 | 3 |
|  | Calcination | Temperature (° C.) | 1000 | 1000 | 1000 | 1000 | 1000 | 1000 |
|  |  | Atmosphere | Oxygen | Oxygen | Oxygen | Oxygen | Oxygen | Oxygen |
|  | Firing | Temperature (° C.) | 1650 | 1650 | 1650 | 1700 | 1700 | 1700 |
|  |  | Time (hour) | 8 | 8 | 8 | 8 | 8 | 8 |
|  |  | Atmosphere | Vacuum | Vacuum | Vacuum | Vacuum | Vacuum | Vacuum |
|  | HIP | Temperature (° C.) | 1800 | 1800 | 1800 | 1800 | 1800 | 1800 |
|  |  | Time (hour) | 10 | 10 | 10 | 10 | 10 | 10 |
|  |  | Pressure (MPa) | 100 | 100 | 100 | 100 | 100 | 100 |
| Evaluation results |  | Insertion loss (dB) | 0.99 | 0.96 | 0.95 | 0.95 | 0.96 | 1.00 |
|  |  | Total transmission (%) | 78.7 | 80.2 | 80.8 | 80.8 | 80.5 | 78.5 |
|  |  | Scattering transmission (%) | 1.20 | 0.90 | 0.70 | 0.60 | 0.80 | 1.30 |
|  |  | Extinction ratio (dB) | 33.0 | 35.2 | 36.0 | 37.0 | 35.5 | 34.0 |
|  |  | Verdet constant (minute/Oe · cm) | 0.20 | 0.21 | 0.20 | 0.21 | 0.21 | 0.20 |
|  |  | Thermal lens (W) | 10 | 25 | 35 | 40 | 30 | 15 |

TABLE 8

|  |  |  | Example | | | | | |
|---|---|---|---|---|---|---|---|---|
|  |  | Three-component co-precipitation | 4-1 | 4-2 | 4-3 | 4-4 | 4-5 | 4-6 |
| Starting material | Terbium oxide | Molar ratio (%) | 90 | 90 | 90 | 90 | 90 | 90 |
|  | Rare earth oxide 1 | Kind | $Y_2O_3$ | $Y_2O_3$ | $Y_2O_3$ | $Y_2O_3$ | $Y_2O_3$ | $Y_2O_3$ |
|  |  | Molar ratio (%) | 10 | 10 | 10 | 10 | 10 | 10 |
|  | Rare earth oxide 2 | Kind | — | — | — | — | — | — |
|  |  | Molar ratio (%) | — | — | — | — | — | — |
|  | Sintering aid 1 | Kind | $ZrO_2$ | $ZrO_2$ | $ZrO_2$ | $ZrO_2$ | $ZrO_2$ | $ZrO_2$ |
|  |  | Content (parts by weight) | 0.4 | 0.8 | 1.1 | 3.0 | 4.6 | 5.5 |
|  | Sintering aid 2 | Kind | — | — | — | — | — | — |
|  |  | Content (parts by weight) | — | — | — | — | — | — |
| Step | Thermal dehydration | Temperature (° C.) | 700 | 700 | 700 | 700 | 700 | 700 |
|  |  | Time (hour) | 3 | 3 | 3 | 3 | 3 | 3 |
|  | Calcination | Temperature (° C.) | 1000 | 1000 | 1000 | 1000 | 1000 | 1000 |
|  |  | Atmosphere | Oxygen | Oxygen | Oxygen | Oxygen | Oxygen | Oxygen |
|  | Firing | Temperature (° C.) | 1750 | 1750 | 1750 | 1800 | 1800 | 1800 |
|  |  | Time (hour) | 8 | 8 | 8 | 8 | 8 | 8 |
|  |  | Atmosphere | Vacuum | Vacuum | Vacuum | Vacuum | Vacuum | Vacuum |
|  | HIP | Temperature (° C.) | 1850 | 1850 | 1850 | 1850 | 1850 | 1850 |
|  |  | Time (hour) | 10 | 10 | 10 | 10 | 10 | 10 |
|  |  | Pressure (MPa) | 100 | 100 | 100 | 100 | 100 | 100 |
| Evaluation results |  | Insertion loss (dB) | 1.00 | 0.97 | 0.96 | 0.96 | 0.97 | 1.00 |
|  |  | Total transmission (%) | 78.2 | 80.0 | 80.4 | 80.5 | 80.6 | 78.0 |
|  |  | Scattering transmission (%) | 1.30 | 0.90 | 0.80 | 0.70 | 0.70 | 1.40 |
|  |  | Extinction ratio (dB) | 33.5 | 35.0 | 37.0 | 37.5 | 36.0 | 32.5 |
|  |  | Verdet constant (minute/Oe · cm) | 0.44 | 0.44 | 0.45 | 0.44 | 0.44 | 0.44 |
|  |  | Thermal lens (W) | 10 | 20 | 30 | 30 | 30 | 15 |

TABLE 9

|  |  |  | Example | | | | | |
|---|---|---|---|---|---|---|---|---|
|  |  | Three-component co-precipitation | 5-1 | 5-2 | 5-3 | 5-4 | 5-5 | 5-6 |
| Starting material | Terbium oxide | Molar ratio (%) | 40 | 40 | 40 | 40 | 40 | 40 |
|  | Rare earth oxide 1 | Kind | $Y_2O_3$ | $Y_2O_3$ | $Y_2O_3$ | $Y_2O_3$ | $Y_2O_3$ | $Y_2O_3$ |
|  |  | Molar ratio (%) | 60 | 60 | 60 | 60 | 60 | 60 |
|  | Rare earth oxide 2 | Kind | — | — | — | — | — | — |
|  |  | Molar ratio (%) | — | — | — | — | — | — |
|  | Sintering aid 1 | Kind | $HfO_2$ | $HfO_2$ | $HfO_2$ | $HfO_2$ | $HfO_2$ | $HfO_2$ |
|  |  | Content (parts by weight) | 0.4 | 0.8 | 1.1 | 3.0 | 4.8 | 5.3 |

TABLE 9-continued

|  |  |  | Example |  |  |  |  |  |
|---|---|---|---|---|---|---|---|---|
|  | Three-component co-precipitation |  | 5-1 | 5-2 | 5-3 | 5-4 | 5-5 | 5-6 |
|  | Sintering aid 2 | Kind | — | — | — | — | — | — |
|  |  | Content (parts by weight) | — | — | — | — | — | — |
| Step | Thermal dehydration | Temperature (° C.) | 700 | 700 | 700 | 700 | 700 | 700 |
|  |  | Time (hour) | 3 | 3 | 3 | 3 | 3 | 3 |
|  | Calcination | Temperature (° C.) | 1000 | 1000 | 1000 | 1000 | 1000 | 1000 |
|  |  | Atmosphere | Oxygen | Oxygen | Oxygen | Oxygen | Oxygen | Oxygen |
|  | Firing | Temperature (° C.) | 1650 | 1650 | 1650 | 1700 | 1700 | 1700 |
|  |  | Time (hour) | 8 | 8 | 8 | 8 | 8 | 8 |
|  |  | Atmosphere | Vacuum | Vacuum | Vacuum | Vacuum | Vacuum | Vacuum |
|  | HIP | Temperature (° C.) | 1800 | 1800 | 1800 | 1800 | 1800 | 1800 |
|  |  | Time (hour) | 10 | 10 | 10 | 10 | 10 | 10 |
|  |  | Pressure (MPa) | 100 | 100 | 100 | 100 | 100 | 100 |
| Evaluation results | Insertion loss (dB) |  | 1.00 | 0.97 | 0.96 | 0.95 | 0.96 | 1.02 |
|  | Total transmission (%) |  | 79.0 | 80.0 | 80.5 | 80.8 | 80.3 | 78.7 |
|  | Scattering transmission (%) |  | 1.30 | 0.80 | 0.75 | 0.65 | 0.75 | 1.20 |
|  | Extinction ratio (dB) |  | 33.5 | 35.5 | 36.0 | 36.5 | 36.0 | 34.5 |
|  | Verdet constant (minute/Oe · cm) |  | 0.21 | 0.20 | 0.21 | 0.20 | 0.20 | 0.21 |
|  | Thermal lens (W) |  | 10 | 30 | 35 | 40 | 35 | 15 |

TABLE 10

|  |  |  | Example |  |  |  |  |  |
|---|---|---|---|---|---|---|---|---|
|  | Three-component co-precipitation |  | 6-1 | 6-2 | 6-3 | 6-4 | 6-5 | 6-6 |
| Starting material | Terbium oxide | Molar ratio (%) | 90 | 90 | 90 | 90 | 90 | 90 |
|  | Rare earth oxide 1 | Kind | $Y_2O_3$ | $Y_2O_3$ | $Y_2O_3$ | $Y_2O_3$ | $Y_2O_3$ | $Y_2O_3$ |
|  |  | Molar ratio (%) | 10 | 10 | 10 | 10 | 10 | 10 |
|  | Rare earth oxide 2 | Kind | — | — | — | — | — | — |
|  |  | Molar ratio (%) | — | — | — | — | — | — |
|  | Sintering aid 1 | Kind | $HfO_2$ | $HfO_2$ | $HfO_2$ | $HfO_2$ | $HfO_2$ | $HfO_2$ |
|  |  | Content (parts by weight) | 0.4 | 0.8 | 1.3 | 3.0 | 4.8 | 5.6 |
|  | Sintering aid 2 | Kind | — | — | — | — | — | — |
|  |  | Content (parts by weight) | — | — | — | — | — | — |
| Step | Thermal dehydration | Temperature (° C.) | 700 | 700 | 700 | 700 | 700 | 700 |
|  |  | Time (hour) | 3 | 3 | 3 | 3 | 3 | 3 |
|  | Calcination | Temperature (° C.) | 1000 | 1000 | 1000 | 1000 | 1000 | 1000 |
|  |  | Atmosphere | Oxygen | Oxygen | Oxygen | Oxygen | Oxygen | Oxygen |
|  | Firing | Temperature (° C.) | 1750 | 1750 | 1750 | 1800 | 1800 | 1800 |
|  |  | Time (hour) | 8 | 8 | 8 | 8 | 8 | 8 |
|  |  | Atmosphere | Vacuum | Vacuum | Vacuum | Vacuum | Vacuum | Vacuum |
|  | HIP | Temperature (° C.) | 1850 | 1850 | 1850 | 1850 | 1850 | 1850 |
|  |  | Time (hour) | 10 | 10 | 10 | 10 | 10 | 10 |
|  |  | Pressure (MPa) | 100 | 100 | 100 | 100 | 100 | 100 |
| Evaluation results | Insertion loss (dB) |  | 1.00 | 0.97 | 0.96 | 0.96 | 0.97 | 1.00 |
|  | Total transmission (%) |  | 78.0 | 80.0 | 80.2 | 80.3 | 80.2 | 77.8 |
|  | Scattering transmission (%) |  | 1.10 | 0.90 | 0.90 | 0.85 | 0.85 | 1.50 |
|  | Extinction ratio (dB) |  | 33.0 | 36.0 | 36.5 | 36.0 | 36.0 | 32.0 |
|  | Verdet constant (minute/Oe · cm) |  | 0.44 | 0.45 | 0.44 | 0.45 | 0.44 | 0.44 |
|  | Thermal lens (W) |  | 10 | 30 | 35 | 30 | 30 | 15 |

TABLE 11

|  |  |  | Example |  |  |  |  |  |
|---|---|---|---|---|---|---|---|---|
|  | Three-component co-precipitation |  | 7-1 | 7-2 | 7-3 | 7-4 | 7-5 | 7-6 |
| Starting material | Terbium oxide | Molar ratio (%) | 70 | 70 | 70 | 70 | 70 | 70 |
|  | Rare earth oxide 1 | Kind | $Y_2O_3$ | $Y_2O_3$ | $Y_2O_3$ | $Y_2O_3$ | $Y_2O_3$ | $Y_2O_3$ |
|  |  | Molar ratio (%) | 30 | 30 | 30 | 30 | 30 | 30 |
|  | Rare earth oxide 2 | Kind | — | — | — | — | — | — |
|  |  | Molar ratio (%) | — | — | — | — | — | — |

TABLE 11-continued

|  |  |  | Example | | | | | |
| --- | --- | --- | --- | --- | --- | --- | --- | --- |
|  | Three-component co-precipitation | | 7-1 | 7-2 | 7-3 | 7-4 | 7-5 | 7-6 |
|  | Sintering aid 1 | Kind | TiO$_2$ | TiO$_2$ | TiO$_2$ | TiO$_2$ | TiO$_2$ | TiO$_2$ |
|  |  | Content (parts by weight) | 0.4 | 0.7 | 1.1 | 2.8 | 4.0 | 5.1 |
|  | Sintering aid 2 | Kind | — | — | — | — | — | — |
|  |  | Content (parts by weight) | — | — | — | — | — | — |
| Step | Thermal dehydration | Temperature (° C.) | 700 | 700 | 700 | 700 | 700 | 700 |
|  |  | Time (hour) | 3 | 3 | 3 | 3 | 3 | 3 |
|  | Calcination | Temperature (° C.) | 1000 | 1000 | 1000 | 1000 | 1000 | 1000 |
|  |  | Atmosphere | Oxygen | Oxygen | Oxygen | Oxygen | Oxygen | Oxygen |
|  | Firing | Temperature (° C.) | 1700 | 1700 | 1700 | 1700 | 1750 | 1750 |
|  |  | Time (hour) | 8 | 8 | 8 | 8 | 8 | 8 |
|  |  | Atmosphere | Vacuum | Vacuum | Vacuum | Vacuum | Vacuum | Vacuum |
|  | HIP | Temperature (° C.) | 1800 | 1800 | 1800 | 1800 | 1800 | 1800 |
|  |  | Time (hour) | 10 | 10 | 10 | 10 | 10 | 10 |
|  |  | Pressure (MPa) | 100 | 100 | 100 | 100 | 100 | 100 |
| Evaluation results | Insertion loss (dB) | | 1.00 | 0.97 | 0.95 | 0.95 | 0.97 | 1.02 |
|  | Total transmission (%) | | 78.8 | 79.0 | 80.6 | 80.5 | 79.2 | 78.2 |
|  | Scattering transmission (%) | | 1.70 | 1.50 | 0.70 | 0.80 | 1.80 | 1.70 |
|  | Extinction ratio (dB) | | 34.0 | 35.5 | 36.0 | 36.0 | 35.0 | 34.0 |
|  | Verdet constant (minute/Oe · cm) | | 0.34 | 0.35 | 0.34 | 0.34 | 0.34 | 0.34 |
|  | Thermal lens (W) | | 10 | 20 | 30 | 30 | 20 | 10 |

TABLE 12

|  |  |  | Example | | | | | |
| --- | --- | --- | --- | --- | --- | --- | --- | --- |
|  | Three-component co-precipitation | | 8-1 | 8-2 | 8-3 | 8-4 | 8-5 | 8-6 |
| Starting material | Terbium oxide | Molar ratio (%) | 80 | 80 | 80 | 80 | 80 | 80 |
|  | Rare earth oxide 1 | Kind | Lu$_2$O$_3$ | Lu$_2$O$_3$ | Lu$_2$O$_3$ | Lu$_2$O$_3$ | Lu$_2$O$_3$ | Lu$_2$O$_3$ |
|  |  | Molar ratio (%) | 20 | 20 | 20 | 20 | 20 | 20 |
|  | Rare earth oxide 2 | Kind | — | — | — | — | — | — |
|  |  | Molar ratio (%) | — | — | — | — | — | — |
|  | Sintering aid 1 | Kind | ZrO$_2$ | ZrO$_2$ | ZrO$_2$ | ZrO$_2$ | ZrO$_2$ | ZrO$_2$ |
|  |  | Content (parts by weight) | 0.4 | 0.7 | 1.2 | 3.0 | 4.5 | 5.3 |
|  | Sintering aid 2 | Kind | — | — | — | — | — | — |
|  |  | Content (parts by weight) | — | — | — | — | — | — |
| Step | Thermal dehydration | Temperature (° C.) | 700 | 700 | 700 | 700 | 700 | 700 |
|  |  | Time (hour) | 3 | 3 | 3 | 3 | 3 | 3 |
|  | Calcination | Temperature (° C.) | 1000 | 1000 | 1000 | 1000 | 1000 | 1000 |
|  |  | Atmosphere | Oxygen | Oxygen | Oxygen | Oxygen | Oxygen | Oxygen |
|  | Firing | Temperature (° C.) | 1800 | 1800 | 1800 | 1850 | 1850 | 1850 |
|  |  | Time (hour) | 8 | 8 | 8 | 8 | 8 | 8 |
|  |  | Atmosphere | Vacuum | Vacuum | Vacuum | Vacuum | Vacuum | Vacuum |
|  | HIP | Temperature (° C.) | 1900 | 1900 | 1900 | 1900 | 1900 | 1900 |
|  |  | Time (hour) | 10 | 10 | 10 | 10 | 10 | 10 |
|  |  | Pressure (MPa) | 100 | 100 | 100 | 100 | 100 | 100 |
| Evaluation results | Insertion loss (dB) | | 1.00 | 0.96 | 0.96 | 0.96 | 0.97 | 1.01 |
|  | Total transmission (%) | | 78.7 | 80.0 | 80.2 | 80.2 | 80.0 | 78.0 |
|  | Scattering transmission (%) | | 1.25 | 0.90 | 0.75 | 0.70 | 0.75 | 1.35 |
|  | Extinction ratio (dB) | | 33.0 | 35.2 | 35.5 | 36.0 | 35.5 | 33.0 |
|  | Verdet constant (minute/Oe · cm) | | 0.38 | 0.38 | 0.38 | 0.38 | 0.39 | 0.38 |
|  | Thermal lens (W) | | 10 | 25 | 30 | 35 | 30 | 10 |

TABLE 13

|  |  |  | Example | | | | | |
| --- | --- | --- | --- | --- | --- | --- | --- | --- |
|  | Three-component co-precipitation | | 9-1 | 9-2 | 9-3 | 9-4 | 9-5 | 9-6 |
| Starting material | Terbium oxide | Molar ratio (%) | 70 | 70 | 70 | 70 | 70 | 70 |
|  | Rare earth oxide 1 | Kind | Sc$_2$O$_3$ | Sc$_2$O$_3$ | Sc$_2$O$_3$ | Sc$_2$O$_3$ | Sc$_2$O$_3$ | Sc$_2$O$_3$ |
|  |  | Molar ratio (%) | 30 | 30 | 30 | 30 | 30 | 30 |
|  | Rare earth oxide 2 | Kind | — | — | — | — | — | — |
|  |  | Molar ratio (%) | — | — | — | — | — | — |

TABLE 13-continued

|  |  |  | Example | | | | | |
|---|---|---|---|---|---|---|---|---|
|  | Three-component co-precipitation | | 9-1 | 9-2 | 9-3 | 9-4 | 9-5 | 9-6 |
|  | Sintering aid 1 | Kind | HfO$_2$ | HfO$_2$ | HfO$_2$ | HfO$_3$ | HfO$_2$ | HfO$_2$ |
|  |  | Content (parts by weight) | 0.4 | 0.8 | 1.4 | 3.0 | 4.7 | 5.5 |
|  | Sintering aid 2 | Kind | — | — | — | — | — | — |
|  |  | Content (parts by weight) | — | — | — | — | — | — |
| Step | Thermal dehydration | Temperature (° C.) | 700 | 700 | 700 | 700 | 700 | 700 |
|  |  | Time (hour) | 3 | 3 | 3 | 3 | 3 | 3 |
|  | Calcination | Temperature (° C.) | 1000 | 1000 | 1000 | 1000 | 1000 | 1000 |
|  |  | Atmosphere | Oxygen | Oxygen | Oxygen | Oxygen | Oxygen | Oxygen |
|  | Firing | Temperature (° C.) | 1700 | 1700 | 1700 | 1700 | 1750 | 1750 |
|  |  | Time (hour) | 8 | 8 | 8 | 8 | 8 | 8 |
|  |  | Atmosphere | Vacuum | Vacuum | Vacuum | Vacuum | Vacuum | Vacuum |
|  | HIP | Temperature (° C.) | 1800 | 1800 | 1800 | 1800 | 1800 | 1800 |
|  |  | Time (hour) | 10 | 10 | 10 | 10 | 10 | 10 |
|  |  | Pressure (MPa) | 100 | 100 | 100 | 100 | 100 | 100 |
| Evaluation results | Insertion loss (dB) | | 1.00 | 0.97 | 0.96 | 0.97 | 0.97 | 1.03 |
|  | Total transmission (%) | | 78.2 | 80.0 | 80.5 | 80.2 | 80.0 | 77.5 |
|  | Scattering transmission (%) | | 1.10 | 0.95 | 0.75 | 0.75 | 0.80 | 1.40 |
|  | Extinction ratio (dB) | | 33.5 | 36.0 | 36.5 | 36.0 | 36.0 | 33.0 |
|  | Verdet constant (minute/Oe · cm) | | 0.34 | 0.34 | 0.34 | 0.35 | 0.34 | 0.34 |
|  | Thermal lens (W) | | 10 | 25 | 30 | 25 | 25 | 10 |

TABLE 14

|  |  |  | Example | | | | | |
|---|---|---|---|---|---|---|---|---|
|  | Three-component co-precipitation | | 10-1 | 10-2 | 10-3 | 10-4 | 10-5 | 10-6 |
| Starting material | Terbium oxide | Molar ratio (%) | 60 | 60 | 60 | 60 | 60 | 60 |
|  | Rare earth oxide 1 | Kind | Y$_2$O$_3$ | Y$_2$O$_3$ | Y$_2$O$_3$ | Y$_2$O$_3$ | Y$_2$O$_3$ | Y$_2$O$_3$ |
|  |  | Molar ratio (%) | 10 | 10 | 10 | 10 | 10 | 10 |
|  | Rare earth oxide 2 | Kind | Gd$_2$O$_3$ | Gd$_2$O$_3$ | Gd$_2$O$_3$ | Gd$_2$O$_3$ | Gd$_2$O$_3$ | Gd$_2$O$_3$ |
|  |  | Molar ratio (%) | 30 | 30 | 30 | 30 | 30 | 30 |
|  | Sintering aid 1 | Kind | TiO$_2$ | TiO$_2$ | TiO$_2$ | TiO$_2$ | TiO$_2$ | TiO$_2$ |
|  |  | Content (parts by weight) | 0.3 | 0.7 | 1.3 | 2.7 | 4.8 | 5.5 |
|  | Sintering aid 2 | Kind | — | — | — | — | — | — |
|  |  | Content (parts by weight) | — | — | — | — | — | — |
| Step | Thermal dehydration | Temperature (° C.) | 700 | 700 | 700 | 700 | 700 | 700 |
|  |  | Time (hour) | 3 | 3 | 3 | 3 | 3 | 3 |
|  | Calcination | Temperature (° C.) | 1000 | 1000 | 1000 | 1000 | 1000 | 1000 |
|  |  | Atmosphere | Oxygen | Oxygen | Oxygen | Oxygen | Oxygen | Oxygen |
|  | Firing | Temperature (° C.) | 1700 | 1700 | 1700 | 1700 | 1750 | 1750 |
|  |  | Time (hour) | 8 | 8 | 8 | 8 | 8 | 8 |
|  |  | Atmosphere | Vacuum | Vacuum | Vacuum | Vacuum | Vacuum | Vacuum |
|  | HIP | Temperature (° C.) | 1800 | 1800 | 1800 | 1800 | 1800 | 1800 |
|  |  | Time (hour) | 10 | 10 | 10 | 10 | 10 | 10 |
|  |  | Pressure (MPa) | 100 | 100 | 100 | 100 | 100 | 100 |
| Evaluation results | Insertion loss (dB) | | 1.02 | 0.97 | 0.96 | 0.96 | 0.97 | 1.02 |
|  | Total transmission (%) | | 79.2 | 80.0 | 80.2 | 80.2 | 80.0 | 78.5 |
|  | Scattering transmission (%) | | 1.50 | 0.90 | 0.85 | 0.85 | 0.90 | 1.45 |
|  | Extinction ratio (dB) | | 33.5 | 35.5 | 36.0 | 36.5 | 35.2 | 34.5 |
|  | Verdet constant (minute/Oe · cm) | | 0.30 | 0.30 | 0.29 | 0.30 | 0.30 | 0.31 |
|  | Thermal lens (W) | | 10 | 20 | 25 | 25 | 20 | 10 |

TABLE 15

|  |  |  | Example | | | | | |
|---|---|---|---|---|---|---|---|---|
|  | Three-component co-precipitation | | 11-1 | 11-2 | 11-3 | 11-4 | 11-5 | 11-6 |
| Starting material | Terbium oxide | Molar ratio (%) | 50 | 50 | 50 | 50 | 50 | 50 |
|  | Rare earth oxide 1 | Kind | Y$_2$O$_3$ | Y$_2$O$_3$ | Y$_2$O$_3$ | Y$_2$O$_3$ | Y$_2$O$_3$ | Y$_2$O$_3$ |
|  |  | Molar ratio (%) | 50 | 50 | 50 | 50 | 50 | 50 |
|  | Rare earth oxide 2 | Kind | — | — | — | — | — | — |
|  |  | Molar ratio (%) | — | — | — | — | — | — |

TABLE 15-continued

| | | Example | | | | | |
|---|---|---|---|---|---|---|---|
| Three-component co-precipitation | | 11-1 | 11-2 | 11-3 | 11-4 | 11-5 | 11-6 |
| | Sintering aid 1 | Kind | $ZrO_2$ | $ZrO_2$ | $ZrO_2$ | $ZrO_2$ | $ZrO_2$ | $ZrO_2$ |
| | | Content (parts by weight) | 1.5 | 2.0 | 2.5 | 3.0 | 5.0 | 0.3 |
| | Sintering aid 2 | Kind | $TiO_2$ | $TiO_2$ | $TiO_2$ | $TiO_2$ | $TiO_2$ | $TiO_2$ |
| | | Content (parts by weight) | 1.0 | 1.0 | 1.0 | 1.0 | 0.3 | 5.2 |
| Step | Thermal dehydration | Temperature (° C.) | 700 | 700 | 700 | 700 | 700 | 700 |
| | | Time (hour) | 3 | 3 | 3 | 3 | 3 | 3 |
| | Calcination | Temperature (° C.) | 1000 | 1000 | 1000 | 1000 | 1000 | 1000 |
| | | Atmosphere | Oxygen | Oxygen | Oxygen | Oxygen | Oxygen | Oxygen |
| | Firing | Temperature (° C.) | 1650 | 1650 | 1700 | 1700 | 1700 | 1650 |
| | | Time (hour) | 8 | 8 | 8 | 8 | 8 | 8 |
| | | Atmosphere | Vacuum | Vacuum | Vacuum | Vacuum | Vacuum | Vacuum |
| | HIP | Temperature (° C.) | 1800 | 1800 | 1800 | 1800 | 1800 | 1800 |
| | | Time (hour) | 10 | 10 | 10 | 10 | 10 | 10 |
| | | Pressure (MPa) | 100 | 100 | 100 | 100 | 100 | 100 |
| Evaluation results | | Insertion loss (dB) | 0.97 | 0.96 | 0.96 | 0.97 | 1.02 | 1.01 |
| | | Total transmission (%) | 80.2 | 80.5 | 80.5 | 80.0 | 78.5 | 78.0 |
| | | Scattering transmission (%) | 0.80 | 0.70 | 0.70 | 0.70 | 1.20 | 1.40 |
| | | Extinction ratio (dB) | 36.0 | 36.5 | 36.5 | 36.5 | 34.5 | 34.0 |
| | | Verdet constant (minute/Oe · cm) | 0.24 | 0.25 | 0.25 | 0.25 | 0.25 | 0.26 |
| | | Thermal lens (W) | 30 | 35 | 35 | 30 | 10 | 10 |

In addition, the crystal structures of the polished surfaces obtained in Example 1-3 and Comparative Example 1A-3 were observed as reflected electron images under an electron microscope, the results being indicated in FIGS. 2A and 2B.

In Comparative Example 1A-3 (FIG. 2B), as seen in the area surrounded by an ellipse in the figure, white spots indicative of a Tb-rich phase and optical defects of $ZrO_2$ were observed. On the other hand, in Example 1-3 (FIG. 2A), there was no such heterophase or defect observed, and the structure was uniform, as seen.

Besides, the crystal structure of the polished surface obtained in Comparative Example 1B-3 was observed as a reflected electron image under an electron microscope. In this case, white spots indicative of a Tb-rich phase and optical defects of $ZrO_2$, like those in FIG. 2B, were observed. In addition, heterophase was also observed.

Note that while the present invention has been described above by way of the embodiments illustrated in the drawings, the invention is not limited to the embodiments indicated in the drawings, and can be changed within such a scope as to be conceivable by a person skilled in the art, such as other embodiments, addition, modification, or deletion. Any mode that produces the advantageous effects of the present invention is therefore embraced in the scope of the present invention.

REFERENCE SIGNS LIST

100 Optical isolator
110 Faraday rotator
112 Optical axis
120 Polarizer
130 Analyzer
140 Magnet
150 Housing

The invention claimed is:

1. A rare earth oxide powder for sintering containing a rare earth oxide including terbium oxide and at least one other rare earth oxide selected from among yttrium oxide, scandium oxide and oxides of lanthanide rare earth elements excluding terbium, the molar ratio of terbium oxide being at least 40 mol % and the balance being the other rare earth oxide, and a sintering aid including an oxide of at least one element selected from among Group 2 elements and Group 4 elements, the rare earth oxide powder obtained by subjecting an aqueous solution containing (a) terbium ions, (b) ions of at least one other rare earth element selected from among yttrium ions, scandium ions and lanthanide rare earth ions excluding terbium ions and (c) ions of at least one element selected from among Group 2 elements and Group 4 elements to co-precipitation of the components (a), (b) and (c), filtration and separation of the co-precipitate and thermal dehydration, wherein the rare earth oxide powder is a three-component co-precipitated raw material for producing a transparent ceramic.

2. The rare earth oxide powder for sintering of claim 1, wherein the content of the sintering aid is at least 1.1 parts by weight and up to 5 parts by weight per 100 parts by weight of the rare earth oxide.

3. The rare earth oxide powder for sintering of claim 1, wherein the sintering aid is an oxide of at least one element selected from among titanium, zirconium, hafnium, calcium and magnesium.

4. A transparent ceramic produced using the rare earth oxide powder for sintering of claim 1
the transparent ceramic containing a rare earth oxide including terbium oxide of the chemical formula: Tb2O3 and an oxide of at least one other rare earth element selected from among yttrium oxide, scandium oxide and oxides of lanthanide rare earth elements excluding terbium, the molar ratio of terbium oxide being at least 40 mol % and the balance being the other rare earth oxide, and a sintering aid including an oxide of at least one element selected from among Group 2 elements and Group 4 elements.

5. The transparent ceramic of claim 4, wherein the content of the sintering aid is more than 0.5 parts by weight and up to 5 parts by weight per 100 parts by weight of the rare earth oxide.

6. The transparent ceramic of claim 4, wherein the sintering aid is an oxide of at least one element selected from among titanium, zirconium, hafnium, calcium and magnesium.

7. The transparent ceramic of claim 4, wherein an insertion loss at a wavelength of 1,064 nm inclusive of a reflection loss at an end face in a plane of at least 90% of a measurement surface in a thickness direction of a 10 mm-thick sample is up to 0.97 dB.

8. A magneto-optical device configured by the transparent ceramic of claim 4.

9. A magneto-optical device comprises the transparent ceramic of claim 4 as a Faraday rotator.

10. The magneto-optical device of claim 9, for an optical isolator for use in a wavelength region of 1,064±40 nm, wherein polarizing materials are provided on front and rear sides of the Faraday rotator.

11. The rare earth oxide powder for sintering of claim 1, wherein the content of the sintering aid is at least 1.1 parts by weight and up to 4.8 parts by weight per 100 parts by weight of the rare earth oxide.

* * * * *